(12) United States Patent
Arakawa

(10) Patent No.: US 9,128,636 B2
(45) Date of Patent: Sep. 8, 2015

(54) METHODS AND APPARATUS FOR MIGRATING THIN PROVISIONING VOLUMES BETWEEN STORAGE SYSTEMS

(71) Applicant: HITACHI, LTD., Tokyo (JP)

(72) Inventor: Hiroshi Arakawa, Sunnyvale, CA (US)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 13/776,361

(22) Filed: Feb. 25, 2013

(65) Prior Publication Data
US 2013/0166872 A1    Jun. 27, 2013

Related U.S. Application Data

(63) Continuation of application No. 12/369,363, filed on Feb. 11, 2009, now Pat. No. 8,407,436.

(51) Int. Cl.
*G06F 12/00*  (2006.01)
*G06F 3/06*  (2006.01)
*G06F 12/02*  (2006.01)

(52) U.S. Cl.
CPC .............. *G06F 3/0665* (2013.01); *G06F 3/067* (2013.01); *G06F 3/0607* (2013.01); *G06F 3/0608* (2013.01); *G06F 3/0644* (2013.01); *G06F 3/0647* (2013.01); *G06F 12/023* (2013.01)

(58) Field of Classification Search
CPC ... G06F 3/0665; G06F 3/0689; G06F 3/0631; G06F 3/0647; G06F 3/065; G06F 3/0664; G06F 3/066; G06F 3/0608; G06F 3/0662
See application file for complete search history.

(56) References Cited

U.S. PATENT DOCUMENTS

| | | | |
|---|---|---|---|
| 7,162,600 B2 | 1/2007 | Kano et al. | |
| 2002/0143733 A1 | 10/2002 | Mukkamalla et al. | |
| 2006/0224844 A1 | 10/2006 | Kano et al. | |
| 2008/0120459 A1* | 5/2008 | Kaneda et al. | 711/112 |

OTHER PUBLICATIONS

Chinese Office Action dated May 24, 2011 for counterpart Application No. 2009101740125.

* cited by examiner

*Primary Examiner* — Reginald Bragdon
*Assistant Examiner* — Thanh D Vo
(74) *Attorney, Agent, or Firm* — Procopio, Cory, Hargreaves & Savitch LLP

(57) ABSTRACT

Multiple storage systems have capability to provide thin provisioning volumes to host computers and capability to transfer (import/export) management information regarding thin provisioning between storage systems. Moreover, at least one of the storage systems posses capability to provide storage area of other storage system as own storage area virtually via connection to the other storage system (i.e. external storage). Target storage system achieves efficient migration and unifying storage resource pool by importing or referring the management information obtained from source storage system and by utilizing the source storage system as external storage. One implementation involves method and process for migration of thin provisioning volumes using chunks having same length between source storage system and destination storage system. In this implementation, storage resource pool is unified by importing management information from the source storage system, and automated page-based relocation is performed to adjust actual location of data.

15 Claims, 24 Drawing Sheets

| TPV ID | Segment ID | Assigned | Internal/External (Tier) | Pool Volume ID | Chunk ID | Under relocation |
|---|---|---|---|---|---|---|
| 0 | 0 | Yes | Internal | 12 | 56 | No |
| | 1 | No | - | - | - | - |
| | 2 | Yes | External | 230 | 29 | No |
| | : | | | | | |
| 1 | 0 | Yes | Internal | 31 | 77 | No |
| | 1 | Yes | Internal | 22 | 90 | Yes |
| | 2 | No | - | - | - | - |
| | : | | | | | |
| : | | | | | | |

Fig. 5

| Pool Volume ID | Internal/External (Tier) | Chunk ID | Usage | TPV ID | Segment ID |
|---|---|---|---|---|---|
| 0 | Internal | 0 | In Use | 14 | 35 |
| | | 1 | Free | - | - |
| | | 2 | In Use | 53 | 46 |
| | | : | | | |
| | | 4096 | Free | - | - |
| | | 4097 | Free | - | - |
| | | : | | | |
| : | | | | | |
| 100 | External | 0 | In Use | 24 | 54 |
| | | 1 | In Use | 32 | 74 |
| | | 2 | Free | - | - |
| | | : | | | |
| : | | | | | |

Fig. 6

| TPV ID | Segment ID | Read / Write | Access rate per unit time | Last access time | Average access length |
|---|---|---|---|---|---|
| 0 | 0 | Read | 15 | 2008/05/07 22:33:59.992 | 4096 |
| | | Write | 4024 | 2008/05/08 02:26:12.005 | 4096 |
| | 1 | Read | 2305 | 2008/05/08 01:02:10.100 | 1048576 |
| | | Write | 67 | 2008/05/07 23:40:01.090 | 1048576 |
| | : | | | | |
| : | : | | | | |

Fig. 8

| Internal Volume ID | Size | Connection Port ID | External Port ID | External LUN | External Storage System |
|---|---|---|---|---|---|
| : | | | | | |
| 100 | 500GB | 12 | 23 | 0 | AA; 1000 |
| 101 | 500GB | 17 | 25 | 2 | BB; 1001 |
| 102 | 1TB | 11 | 22 | 3 | CC; 2000 |
| : | | | | | |

Fig. 11

| Relocation Type | Condition 1 | AND/OR | Condition 2 |
|---|---|---|---|
| From Internal (High Tier) to External (Low Tier) | Access rate per unit time < 1500 | AND | Last access time is earlier than 10 days ago |
| From External (Low Tier) to Internal (High Tier) | Access rate per unit time > 3000 | AND | Access Length < 16384 |
| From External (Low Tier) to Internal (High Tier) | Access rate per unit time > 1500 | AND | Access Length >= 16384 |
| : | | | |

| TPV ID | Segment ID | Destination | | Copy pointer |
|---|---|---|---|---|
| | | Pool Volume ID | Chunk ID | |
| 0 | 0 | 27 | 28 | 204800 |
| 2 | 1 | 11 | 18 | 489600 |
| : | | | | |

| TPV ID | Segment ID | Assigned | Pool Volume ID | Chunk ID |
|---|---|---|---|---|
| 0 | 0 | Yes | 12 | 56 |
| | 1 | No | - | - |
| | 2 | Yes | 230 | 29 |
| | : | | | |
| 1 | 0 | Yes | 31 | 77 |
| | 1 | Yes | 22 | 90 |
| | 2 | No | - | - |
| | : | | | |
| : | | | | |

Fig. 18

| Pool Volume ID | Chunk ID | Usage | TPV ID | Segment ID |
|---|---|---|---|---|
| 0 | 0 | In Use | 14 | 35 |
| | 1 | Free | - | - |
| | 2 | In Use | 53 | 46 |
| | : | | | |
| | 4096 | Free | - | - |
| | 4097 | Free | - | - |
| | : | | | |
| : | | | | |
| 100 | 0 | In Use | 24 | 54 |
| | 1 | In Use | 32 | 74 |
| | 2 | Free | - | - |
| | : | | | |

Fig. 19

METHODS AND APPARATUS FOR MIGRATING THIN PROVISIONING VOLUMES BETWEEN STORAGE SYSTEMS

CROSS-REFERENCE TO RELATED APPLICATIONS

This application is a Continuation of U.S. patent application Ser. No. 12/369,363 filed Feb. 11, 2009, now issued U.S. Pat. No. 8,407,436, the disclosure of which is incorporated herein by reference in its entirety for all purposes.

BACKGROUND

1. Field of the Invention

This invention generally relaters to storage technology and, more particularly, to method and apparatus for migrating thin provisioning volumes between storage systems. In addition, this invention relates to unification of a storage resource pool.

2. Description of the Related Art

To reduce storage costs, management costs and power consumption, thin provisioning capability in storage systems has been implemented. With thin provisioning, a storage system provides virtual volumes as storage area to store data for host computers. In the virtual volumes, the storage system allocates and assigns physical data storage areas only to target locations of a write access command received from host computers. Because not all virtual storage locations are associated with physical storage location, the total amount of used physical area in pool can be smaller than total amount of virtual area shown to the host computers. To achieve this capability, the storage system divides storage area (e.g. storage area in HDD or flash memory) into plurality of fixed-length areas called chunks or pages, and manages mapping between chunks and logical segments in the virtual volumes.

For example, U.S. Pat. No. 7,162,600, incorporated herein by reference, discloses techniques for implementing thin provisioning in a storage system and for utilizing external storage. Specifically, methods for migration between normal (not thin provisioning) volumes and thin provisioning volumes are disclosed.

However, because the thin provisioning is independently implemented in each storage system, efficient migration of thin provisioning volumes between multiple storage systems is not easily achieved. That is, migration of thin provisioning volumes requires transferring the entire storage capacity of the virtual volumes between storage systems even if the virtual volumes store only a small amount of actual data. Specifically, the conventional technology does not provide a method for achieving efficient migration of thin provisioning volumes when the chunk length is deferent between the storage systems.

Migration of volumes between storage systems may be required when data stored in the volumes is moved from old storage system to new storage system for repurposing/reuse of the old storage system or when storage environment is reconstructed in order to achieve centralized management on one storage system with virtualization of external storage (e.g. unifying storage resource pool).

Therefore, what is needed is a method and apparatus to achieve efficient migration of thin provisioning volumes between storage systems and to unify the storage resource pool.

SUMMARY OF THE INVENTION

The inventive methodology is directed to methods and systems that substantially obviate one or more of the above and other problems associated with conventional techniques for migrating thin provisioning volumes and for unifying the storage resource pool.

In an embodiment of the presented invention, multiple storage systems have a capability to provide thin provisioning volumes to host computers and a capability to transfer (import/export) management information relating to thin provisioning configuration between the storage systems. Moreover, at least one of the storage systems posses a capability to provide storage area of other storage system as own storage area virtually via connection to the other storage system (i.e. external storage). A storage system that is destination of migration of thin provisioning volumes achieves efficient migration and unifying storage resource pool by importing or referring the management information obtained from other storage system that is source of the migration and by utilizing the source storage system as external storage.

One embodiment of the invention provides method and process for migration of thin provisioning volumes using chunks having the same length between source storage system and destination storage system. In this embodiment, storage resource pool is unified by importing management information from the source storage system, and automated page-based relocation is performed to adjust actual location of data.

Another embodiment shows method and process for migration of thin provisioning volumes having different chunk length between source storage system and destination storage system. In this embodiment, management information relating to thin provisioning volumes in the source storage system is used by the destination storage system to perform the migration.

In accordance with one aspect of the present invention there is provided a thin provisioning storage system including multiple data storage units, the multiple data storage units being divided into multiple chunks forming a chunk pool. The inventive thin provisioning storage system also includes at least one network interface configured to connect the storage system with a source thin provisioning storage system and at least one host computer. The thin provisioning storage system further includes a storage controller incorporating a central processing unit and a memory. The aforesaid storage controller is configured to import source mapping information from the source thin provisioning storage system, the source mapping information being indicative of a correspondence of allocated chunks to a source data storage volume in the source thin provisioning storage system; use the source mapping information to provision a target data storage volume; and make the provisioned target data storage volume available to the at least one host computer via the at least one network interface.

In accordance with another aspect of the present invention, there is provided a thin provisioning storage system including multiple data storage units, the multiple data storage units being divided into a multiple chunks forming a chunk pool. The inventive thin provisioning storage system also includes at least one network interface configured to connect the storage system with a second thin provisioning storage system and at least one host computer; and a storage controller including a central processing unit and a memory. The storage controller is configured to: import source mapping information from the source thin provisioning storage system, the source mapping information being indicative of a correspondence of allocated chunks to a source data storage volume in the source thin provisioning storage system; and use the source mapping information to make the source data storage volume available as external storage to the at least one host computer via the at least one network interface.

In accordance with yet another aspect of the present invention there is provided a thin provisioning storage system including multiple data storage units, the multiple data storage units being divided into a plurality of chunks forming a chunk pool. The inventive thin provisioning storage system also includes at least one network interface configured to connect the storage system with a target thin provisioning storage system and at least one host computer; and a storage controller including a central processing unit and a memory. The storage controller is configured to provision a source data storage volume and to make the source data storage volume available to the host computer via the at least one network interface. Upon receipt of a write command directed to the source data storage volume from the at least one host computer, the storage controller allocates at least one chunk from the chunk pool to the source data storage volume and stores the data associated with the write command in the allocated at least one chunk. The storage controller also stores source mapping information indicative of the correspondence of the allocated chunk to the source data storage volume and exports the source mapping information to the target thin provisioning storage system.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 5 illustrates an example of mapping information.

FIG. 6 illustrates an exemplary embodiment of pool information.

FIG. 8 illustrates an example of access information.

FIG. 11 illustrates an example of external storage information.

FIG. 18 and FIG. 19 illustrate exemplary embodiments of mapping information and pool information.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

A. 1st Embodiment

A.1. System Configuration

Figure 1:
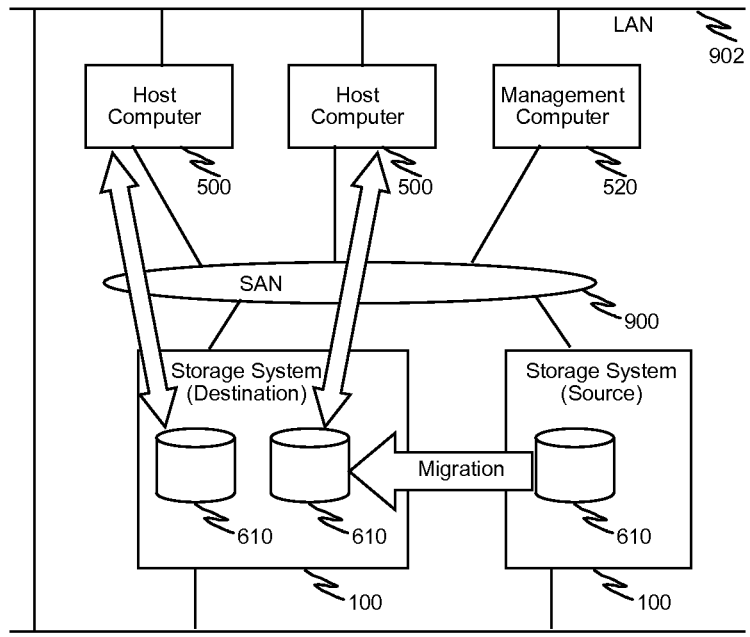
FIG. 1 provides an overview of migration of thin provisioning volumes between multiple storage systems.
Figure 2:
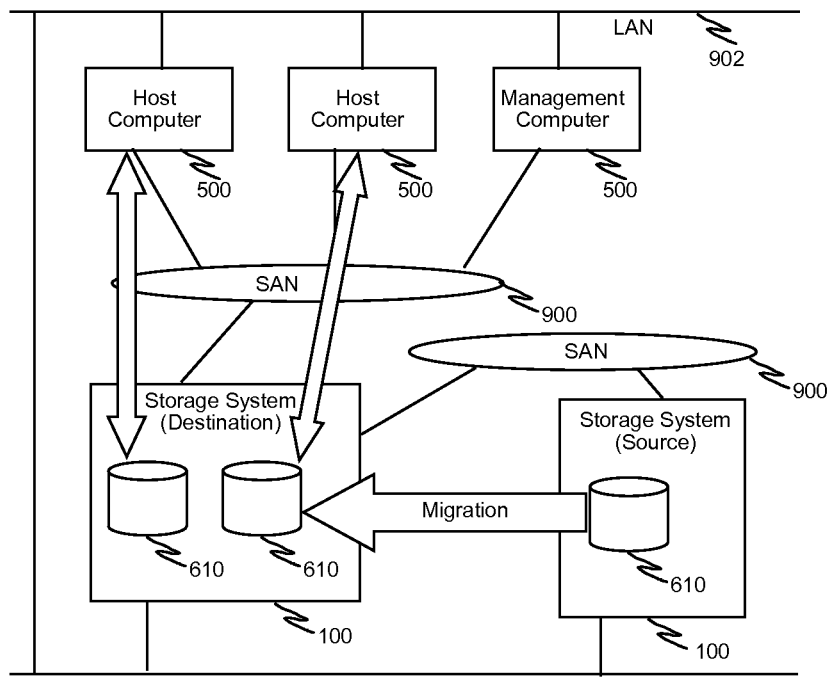
FIG. 2 provides another example of configuration, wherein SAN is separated before the migration to avoid influence of migration on SAN between host computer and storage system.

FIG. 1 presents an overview of migration of thin provisioning volumes between multiple storage systems. As mentioned below, host computers 500 and management computer 520 are connected to storage systems 100 by SAN 900 and LAN 902. Each storage system 100 can provides thin provisioning volumes to these computers. As also mentioned below, migration of data in one or more thin provisioning volumes from source storage system 100 to destination storage system 100 via SAN 900 can be performed by destination storage system 100 according to instructions from management computer 520. In FIG. 2, as another example of configuration, SAN 900 is separated before the migration to avoid influence of migration on SAN 900 between host computer 500 and storage system 100.

Figure 3:
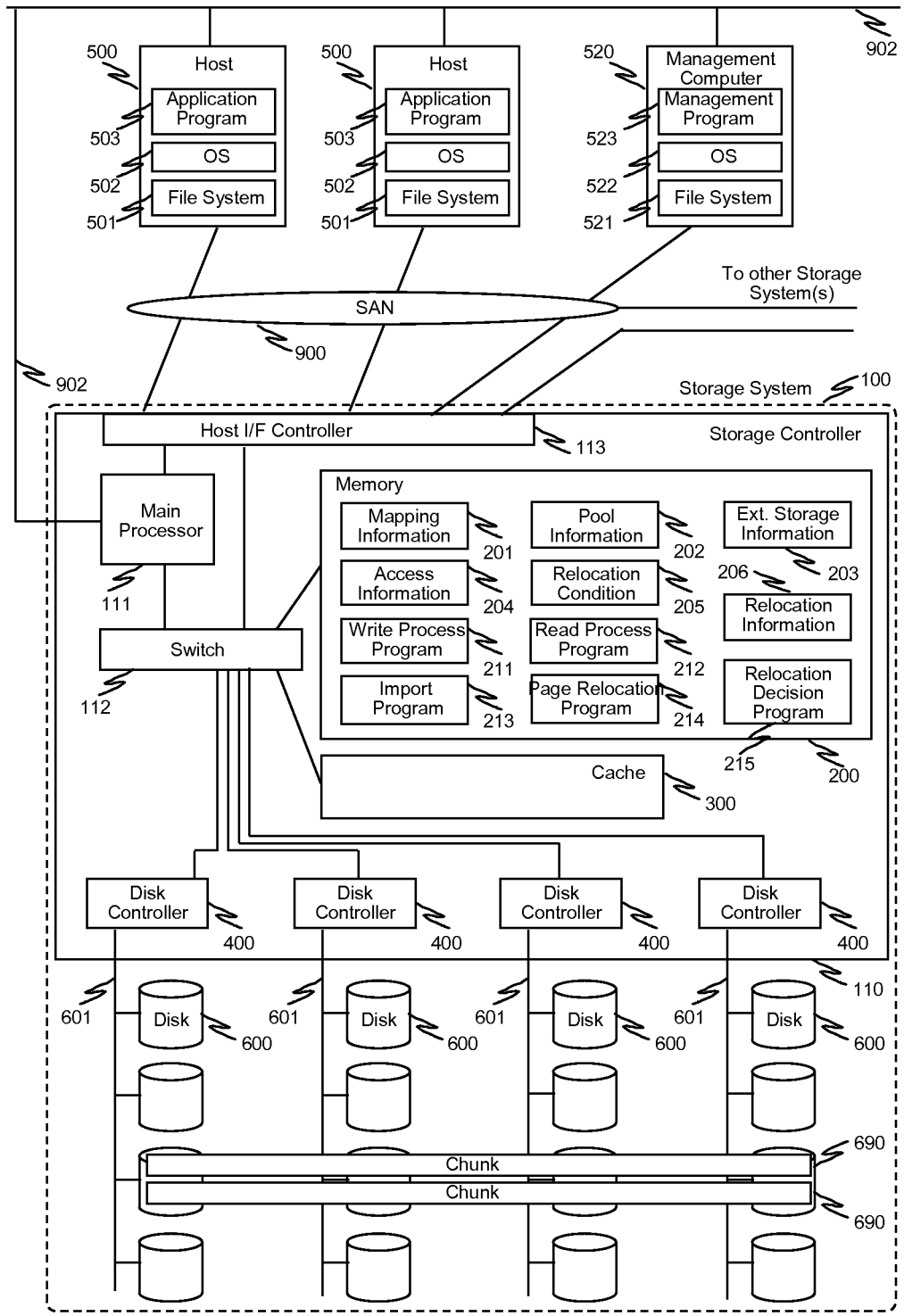
FIG. 3 illustrates an exemplary system configuration.

FIG. 3 illustrates an exemplary system configuration. Specifically, a storage system 100, using which this invention may be implemented, consists of the following components: Storage controller 110; Main processor 111; Switch 112; Host interface 113; Memory 200; Cache 300; Disk controller 400; Disks (e.g. HDD) 610; and Backend path 601 (e.g. Fibre Channel, SATA, SAS, iSCSI(IP)).

The Main processor 101 performs various processes with respect to the storage controller 100. Main processor 101 and other components use the following information stored in memory 200: Mapping information 201; Pool information 202; External storage information 203; Access information 204; Relocation condition 205; and Relocation information 206.

Main processor 101 performs the processes by executing the following programs stored in memory 200: Write process program 211; Read process program 212; Import program 213; Page relocation program 214; and Relocation decision program 215. The details of these processes are described in detail below.

Host 500 and Management computer 520 are connected to host interface 113 via SAN 900 (e.g. Fibre Channel, Fibre Channel over Ethernet, iSCSI(IP)). Host 500 and Management computer 520 and storage controller 110 are connected each other via LAN 902 (e.g. IP network).

Volumes (Logical Units) provided by storage system 100 are produced from collection of areas in HDDs. They may be protected by storing parity code (i.e. by RAID configuration) or mirroring.

Host 500 has file system 501, OS 502 and application program 503. To perform these programs, host 500 also has resources such as processor, memory, storage devices not shown in FIG. 1.

Management computer 520 has file system 521, OS 522 and management program 523. To perform these programs, host 500 also has resources such as processor, memory, storage devices not shown in FIG. 1.

A.2. Overview of Method to Providing Volumes

Figure 4:
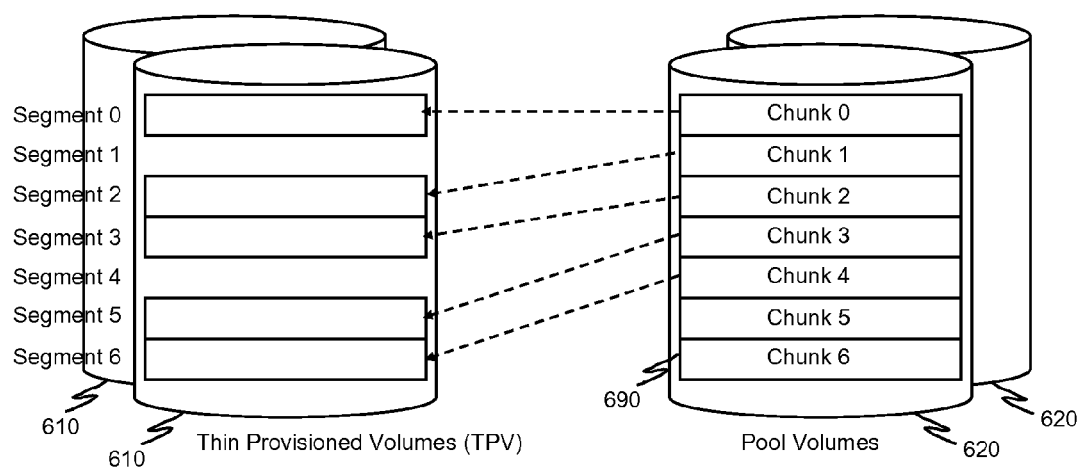
FIG. 4 illustrates a structure and method for providing a thin provisioning volume (TPV).

FIG. 4 shows structure and method to provide TPV. The storage system 100 has pool volumes 620 and divides pool volumes 620 into a number of fixed-length areas called chunk 690. The storage system 100 assigns a chunk 690 to a segment of a virtual volume (TPV) on write access. In other words, physical storage area is assigned on demand. In FIG. 4, a TPV is constituted by multiple segments virtually, and a chunk 690 is allocated from pool volume 620 and assigned to a segment (i.e. a fixed length area (page) of TPV). For example, chunk 4 is assigned to segment 6 in this figure. That is, a TPV is a page-based volume.

To achieve this, storage controller 110 uses mapping information 201 and pool information 202. FIG. 5 is an example of mapping information 201. This information maintains mapping between chunks and segments of each volume. Status of assignment is 'No' if no chunk is assigned to the segment. The Internal/External (tier) indicates whether the data in the chunk is located in this storage system 100 or external storage system 100 connected by SAN 900. Performance for accessing chunks in external storage is generally lower than accessing internal chunk because access to external storage system 100 has overhead, thus this information also indicates storage tier where the data located in. That is, internal storage is higher tier and external storage is lower tier. A usage of flag of "under relocation" is described later. This information can be constructed as list or directory of each element for faster search.

FIG. 6 shows an example of pool information 202. This information manages whether a chunk is used or not. By using this information, storage controller 110 is able to find free (unused) chunks in write process described below. The tier that the chunk belongs to at that time is indicated in 'Tier' section. This information also can be constructed as list or directory of each element to search a free chunk quickly. As described in FIG. 6, pool volumes 620 managed by this information can include volumes in external storage system 100. That is, this storage system 100 can use volumes provide by the external storage system 100 via SAN 900 as virtual volumes of this storage system 100 and can apply the virtual volumes to pool volumes 620.

U.S. Pat. No. 7,441,096, incorporated herein by reference, discloses an example of method to realize page-based transparent data relocation between chunks by copying data and changing mapping information 201 by the storage system 100.

A.3. Write Process for TPV

Figure 7:
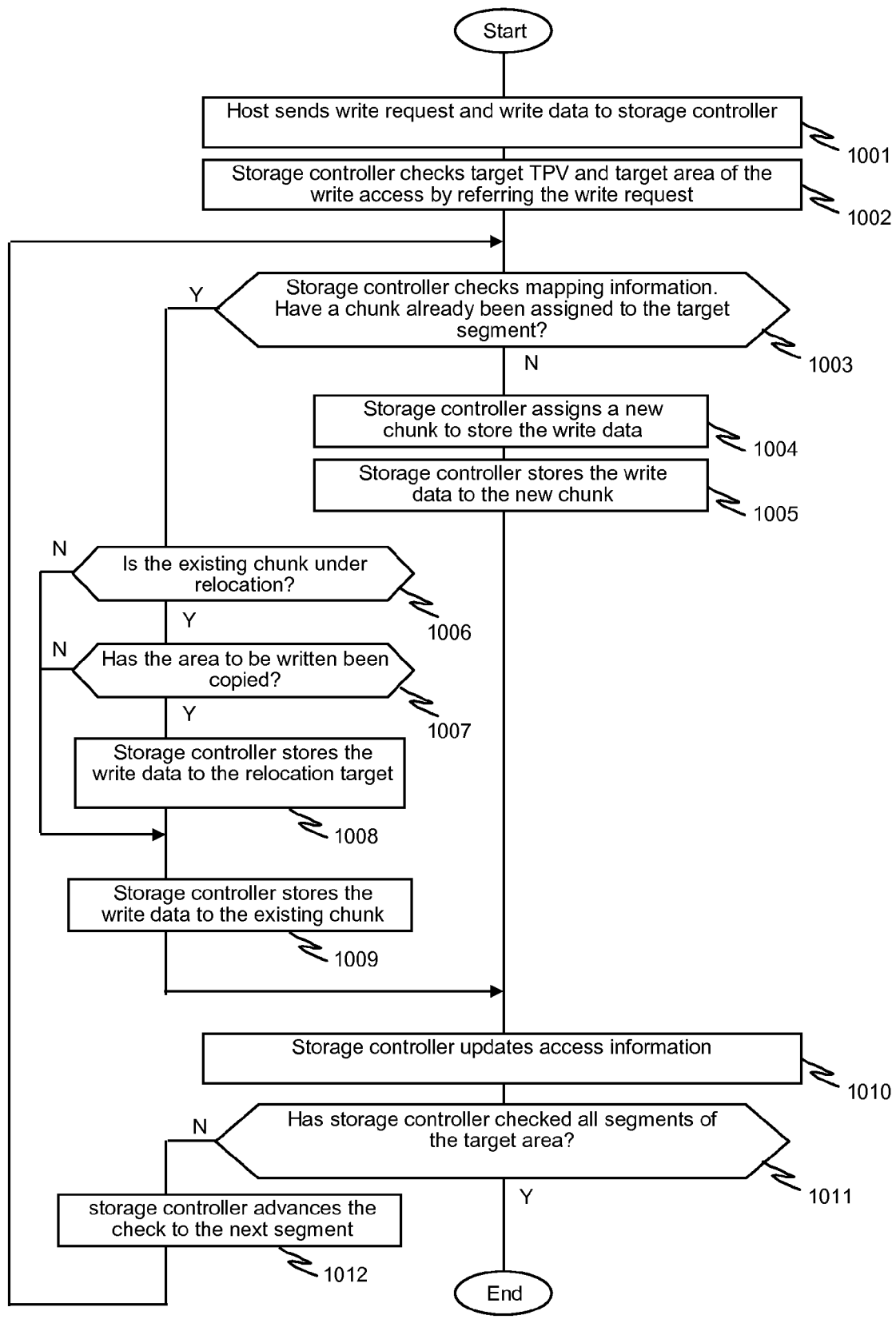
FIG. 7 illustrates an exemplary embodiment of a write process for a TPV.

FIG. 7 illustrates a write process for TPV 610.

At step 1001, host 500 issues a write request and transfers write data to storage controller 110.

At step 1002, the storage controller 110 checks target TPV 610 and target area of the write access by referring the write request.

At step 1003, the storage controller 110 checks the mapping information 201 for a segment in the target area. If a chunk has already been assigned to the segment, the process proceeds to step 1006. If not, the process proceeds to step 1004.

At step 1004, the storage controller 110 assigns a new chunk to store the write data. To do this, the storage controller 110 updates mapping information 201 and pool information 202. By using pool information 202, the storage controller 110 finds the new chunk from internal storage.

At step 1005, the storage controller 110 stores the write data to the new chunk. And then the process proceeds to step 1010.

At step 1006, the storage controller 110 checks 'under relocation' flag in mapping information 201. This flag is set in relocation process described later and shows whether the chunk is under relocation or not. If under relocation, the process proceeds to step 1007. If not, the process proceeds to step 1009.

At step 1007, by referring relocation information 206 described later, the storage controller 110 checks whether the area regarding write in the chunk has been copied in the relocation process. If yes, the process proceeds to step 1008. If not, the process proceeds to step 1009.

At step 1008, the storage controller 110 stores the write data to the relocation target.

At step 1009, the storage controller 110 stores the write data to the existing chunk.

At step 1010, the storage controller 110 updates access information 204. This information records access characteristics regarding the segment (i.e. page) and used for determination of relocation described later.

At step 1011, if the storage controller 110 has checked all segments of the target area, the process ends. If not, the storage controller 110 advances the check to the next segment (step 1012).

FIG. 8 illustrates an example of access information 204. This maintains information regarding access each segments such as access rate per unit time, last access time and average access length, for each of read and write. The information regarding average access length may be initialized at a certain interval.

A.4. Read Process for TPV

Figure 9:
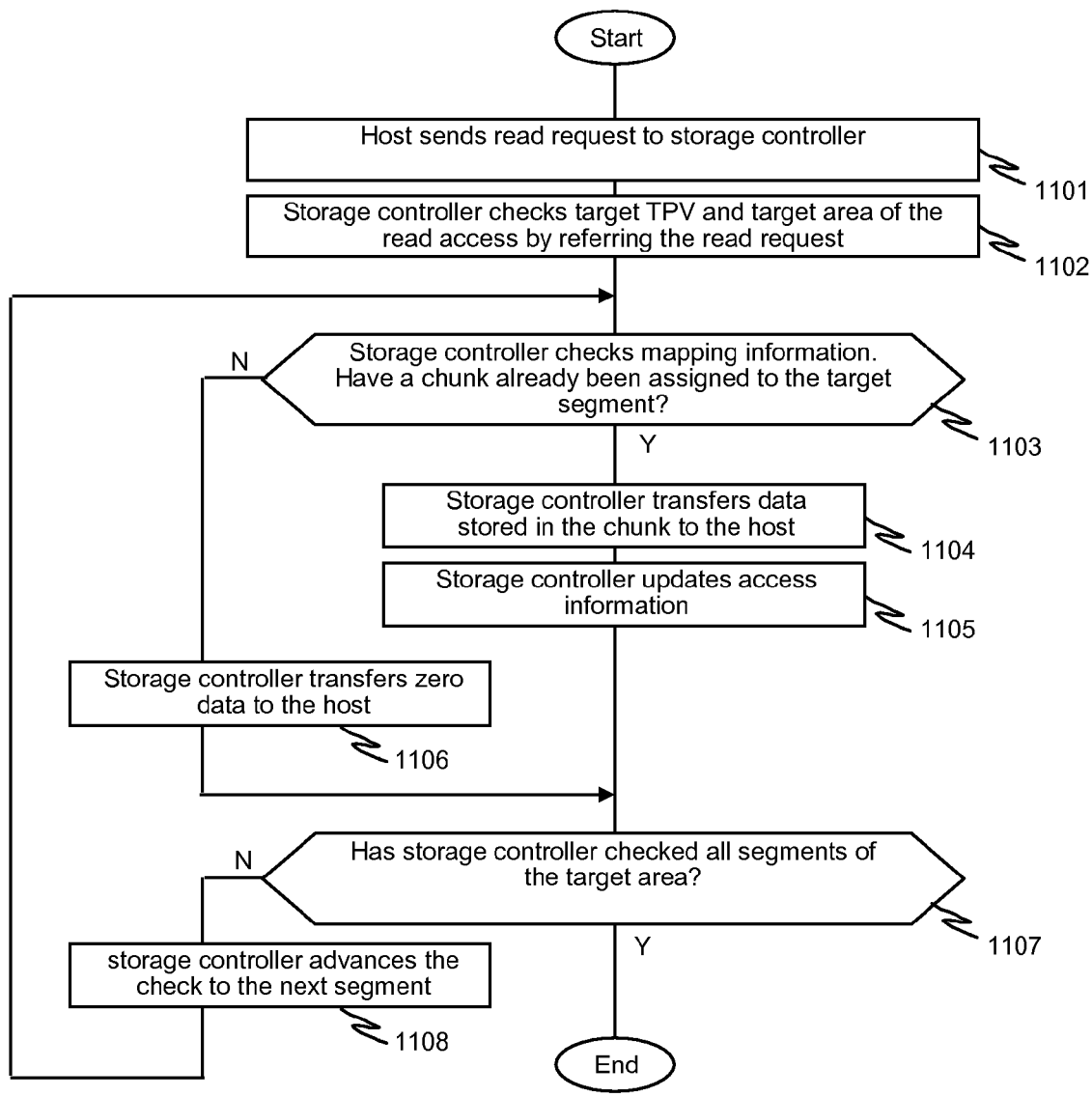
FIG. 9 illustrates a read process for TPV.

FIG. 9 shows a read process for TPV 610.

At step 1101, host 500 issues a read request to storage controller 110.

At step 1102, the storage controller 110 checks target TPV 610 and target area of the read access by referring the read request.

At step 1103, the storage controller 110 checks the mapping information 201 for a segment in the target area. If a chunk has already been assigned to the segment, the process proceeds to step 1104. If not, the process proceeds to step 1106.

At step 1104, the storage controller 110 transfers data stored in the chunk to the host 500.

At step 1105, the storage controller 110 updates access information 204.

At step 1106, the storage controller 110 sends data of zero (0) to the host 500.

At step 1107, if the storage controller 110 has checked all segments of the target area, the process ends. If not, the storage controller 110 advances the check to the next segment (step 1108).

A.5. Process for Migration of TPV Between Storage Systems

Migration of data stored in volumes between storage systems is required when the data is moved from old storage system to new storage system for repurposing/reuse of the old storage system or when storage environment is reconstructed in order to achieve centralized management on one storage system with virtualization of external storage.

Figure 10:
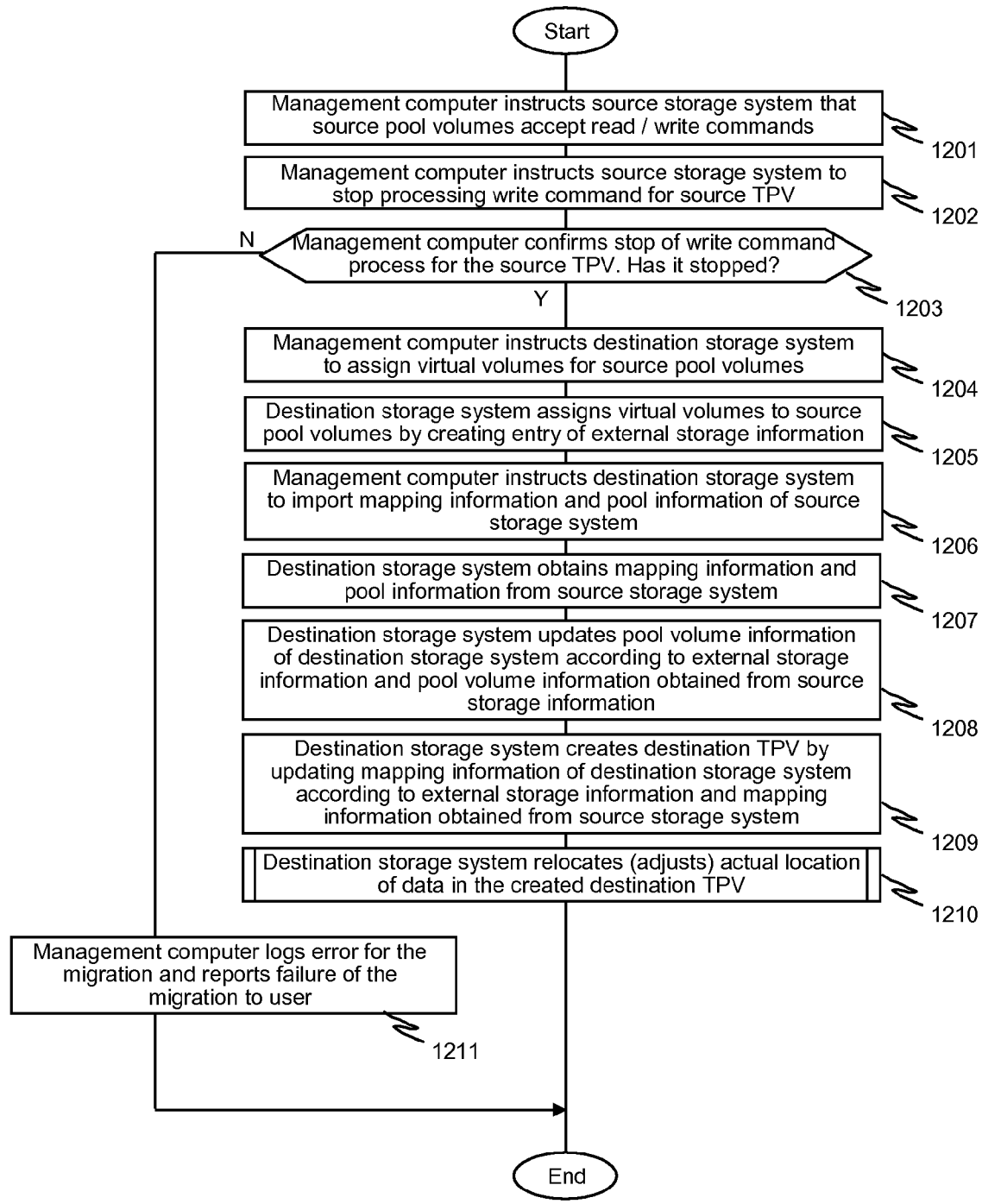
FIG. 10 illustrates an exemplary process for efficient migration of data from source TPV in source storage system to destination TPV in destination storage system.

FIG. 10 describes process for efficient migration of data from source TPV 610 in source storage system 100 to destination TPV 610 in destination storage system 100.

Before the beginning of this process, source pool volumes 620 related to the source TPV 610 in the source storage system 100 have to be reachable from the destination storage system 100 via SAN 900.

At step 1201, management computer 520 instructs storage system 100 having source TPV 610 (source storage system 100) that pool volumes 620 related to source TPV 610 (source pool volumes 620) accept read/write commands.

At step 1202, the management computer 520 instructs source storage system 100 to prohibit write access to source TPV 610.

At step 1203, the management computer 520 checks whether the write process is stopped or not. If the write process is stopped successfully, the process proceeds to step 1204. If not, the process proceeds to step 1211.

At step 1204, the management computer 520 instructs destination storage system 100 to assign virtual volumes for the source pool volumes 620 with write protection.

At step 1205, the destination storage system 100 assigns virtual volumes to the source pool volume 620 as external storage by updating external storage information 203. The virtual volumes may be write-protected. FIG. 11 illustrates an example of external storage information 203. This information maintains mapping between the virtual volume and volume of external storage. Internal volume ID indicates an identifier of the virtual volume in the destination storage system 100. Connection port ID indicates an identifier of a port connected to SAN 900 toward the source pool volume 620. That is, Connection port ID indicates identifier of a port of the destination storage system 100. External port ID indicates an identifier of a port of the source storage system 100 wherein the port is used to access the source pool volume 620. External LUN (logical unit number) indicates LUN of the source pool volume 620. External storage system indicates information regarding the source storage system 100 such as vender name, product name and serial number. As described in U.S. Pat. No. 7,162,600, the destination storage system 100 can access volumes in the source storage system 100 as own volume by using this information.

At step 1206, the management computer 520 instructs the destination storage system 100 to import mapping information 201 of the source storage system 100 for the source TPV 610 and pool information 202 of the source storage system 100 for the source pool volume 620.

At step 1207, the destination storage system 100 communicates with the source storage system 100 via LAN 902 and obtains the mapping information 201 and the pool information 202 from the source storage system 100.

At step 1208, the destination storage system 100 updates pool information 202 of the destination storage system 100 by referring the external storage information 203 and the pool information 202 obtained from the source storage system 100.

At step 1209, the destination storage system 100 creates destination TPV 610 by updating mapping information 201 of the destination storage system 100 according to the external storage information 203 and mapping information 201 obtained from the source storage system 100. In other words, TPV 610 in the source storage system 100 is reproduced in the destination storage system 100 and actual data located in external storage can be accessible by the aforesaid external storage access capability (via SAN 900).

After creation of the destination TPV 610 in the destination storage system 100, at step 1210, the destination storage system 100 relocates (adjusts) actual location of data in the destination TPV 610. The detailed process of relocation is described later.

At step 1211, the management computer 520 logs an occurrence of error for the migration and reports failure of the migration to user.

A.6. Relocation Decision Process

Figures 12, 13:
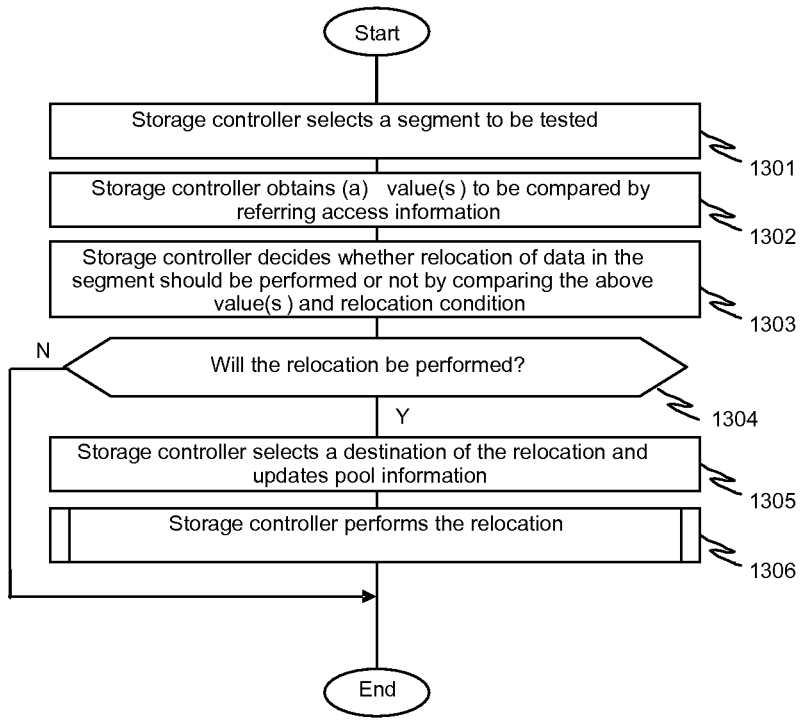
FIG. 12 illustrates a process for determining whether the relocation will be performed or not.
FIG. 13 illustrates an example of relocation condition.

FIG. 12 shows a process for determining whether the relocation will be performed or not.

At step 1301, storage controller 110 chooses a segment (i.e. page) to be examined.

At step 1302, by referring access information 204, the storage controller 110 obtains (a) value(s) to be compared with relocation condition 205.

At step 1303, the storage controller 110 decides whether relocation of data in the segment should be performed according to relocation condition 205. FIG. 13 shows an example of relocation condition 205. This information maintains conditions to determine occurrence of relocation for each movement between tiers. The condition may be registered by user via host 500, management computer 520 and/or management terminal of the storage system 100. The storage controller 110 can determine the occurrence by referring (comparing) the above value(s) and the conditions.

At step 1304, if the relocation will be performed as the result of the decision, the process proceeds to step 1305. If not, the process ends.

At step 1305, the storage controller 110 finds a destination of the relocation in suitable tier determined from the condition and updates pool information 202.

At step 1306, the storage controller 110 performs the relocation. The detailed process is described later.

In order to adjust actual location of data in TPV 610 according to usage of data, the above relocation decision process is repeated at a predetermined interval or performed when load of the storage system 110 is low. This process is performed for segments that have stored data. By this process, location of data is adjusted in one storage resource pool including internal storage and external storage, and data can be moved from external storage (i.e. source storage system 100) to internal storage (i.e. destination storage system 100) according to conditions like access rate.

A.7. Relocation Process

Figures 14, 15:
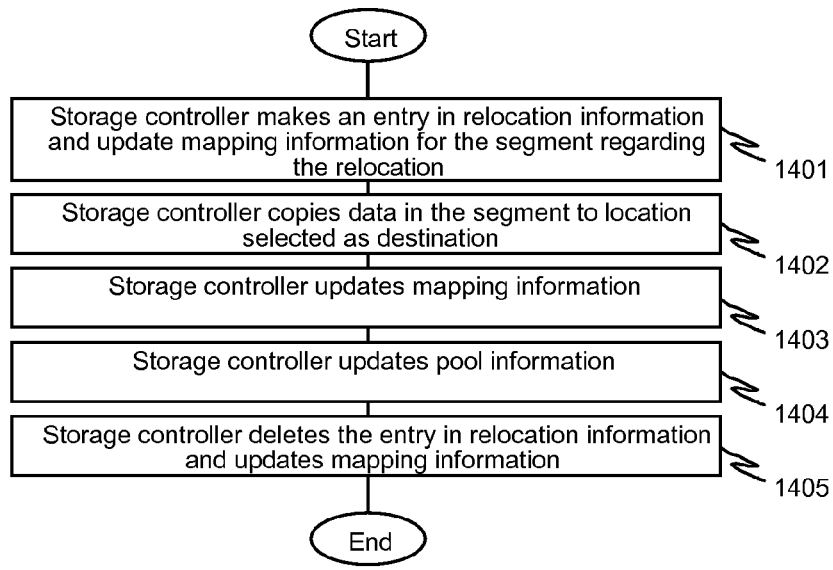
FIG. 14 illustrates the relocation process performed in step 1306 described in FIG. 12.
FIG. 15 illustrates an example of the relocation information.

FIG. 14 illustrates the relocation process performed in step 1306 described in FIG. 12.

At step 1401, storage controller 110 makes an entry in relocation information 206 for the segment to be moved. FIG. 15 shows an example of the relocation information 206. Relocation information 206 has ID of the segment to be moved, information regarding the unused location selected as destination and copy pointer that denotes progress of copy. The storage controller 110 also sets a flag of "under relocation" for the segment in mapping information 201 to 'Yes'.

At step 1402, the storage controller 110 copies data in the segment to location selected as destination. According to progress of the copying, copy pointer in relocation information 206 is updated and is moving forward.

At step 1403, after completion of the copying, storage controller 110 updates mapping information 201 to change mapping between the segment and physical location according to the relocation. This realizes the transparent relocation of the segment for host 500.

At step 1404, the storage controller 110 updates pool information 202 to release the chunk that had the segment if no segment uses the chunk.

At step 1405, the storage controller 110 deletes the entry in relocation information 206 and updates mapping information to set the flag of "under relocation" for the segment to 'No'.

By using the method described above, efficient migration of TPV 610 between pluralities of storage systems is achieved. This migration method realizes reduction of amount of data handled and transferred in the migration. It also realizes unified storage pool including internal storage and external storage with data placement optimization by automated data relocation.

B. 2nd Embodiment

Figure 16:
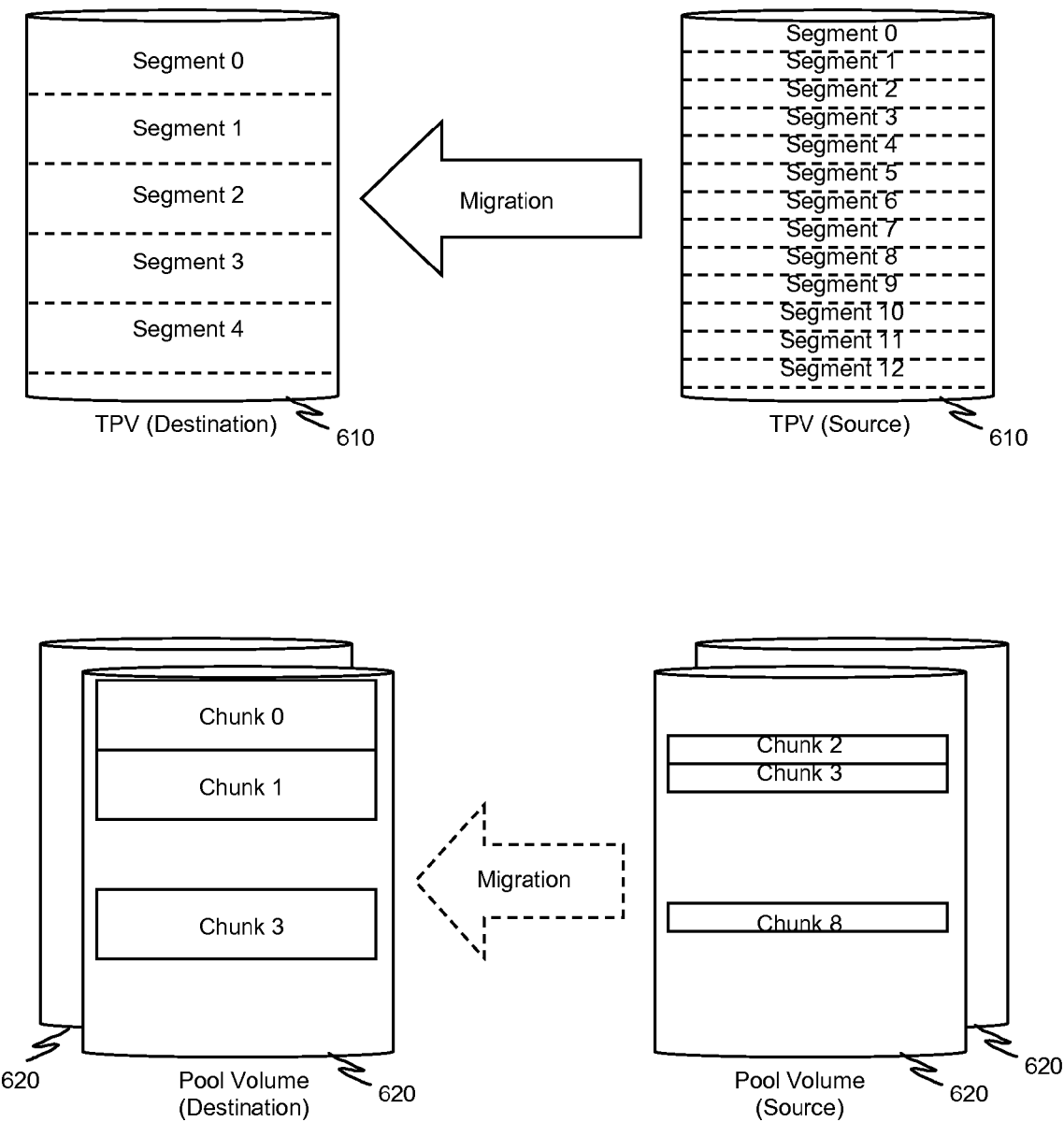
FIG. 16 illustrates an example of unmatched boundary of segment and chunk between source storage system and destination storage system.

Size of segment (i.e. size of chunk) can be different between source storage system 100 and destination storage system 100, especially when they are different products. As illustrated in FIG. 16, difference of segment size causes discrepancy of boundary of segment and chunk between source storage system 100 and destination storage system 100. The following processes described in this embodiment can be applied especially when segment size is different between source TPV 610 and destination TPV 610.

B.1. Process for Migration of TPV Between Storage Systems

Figure 17:
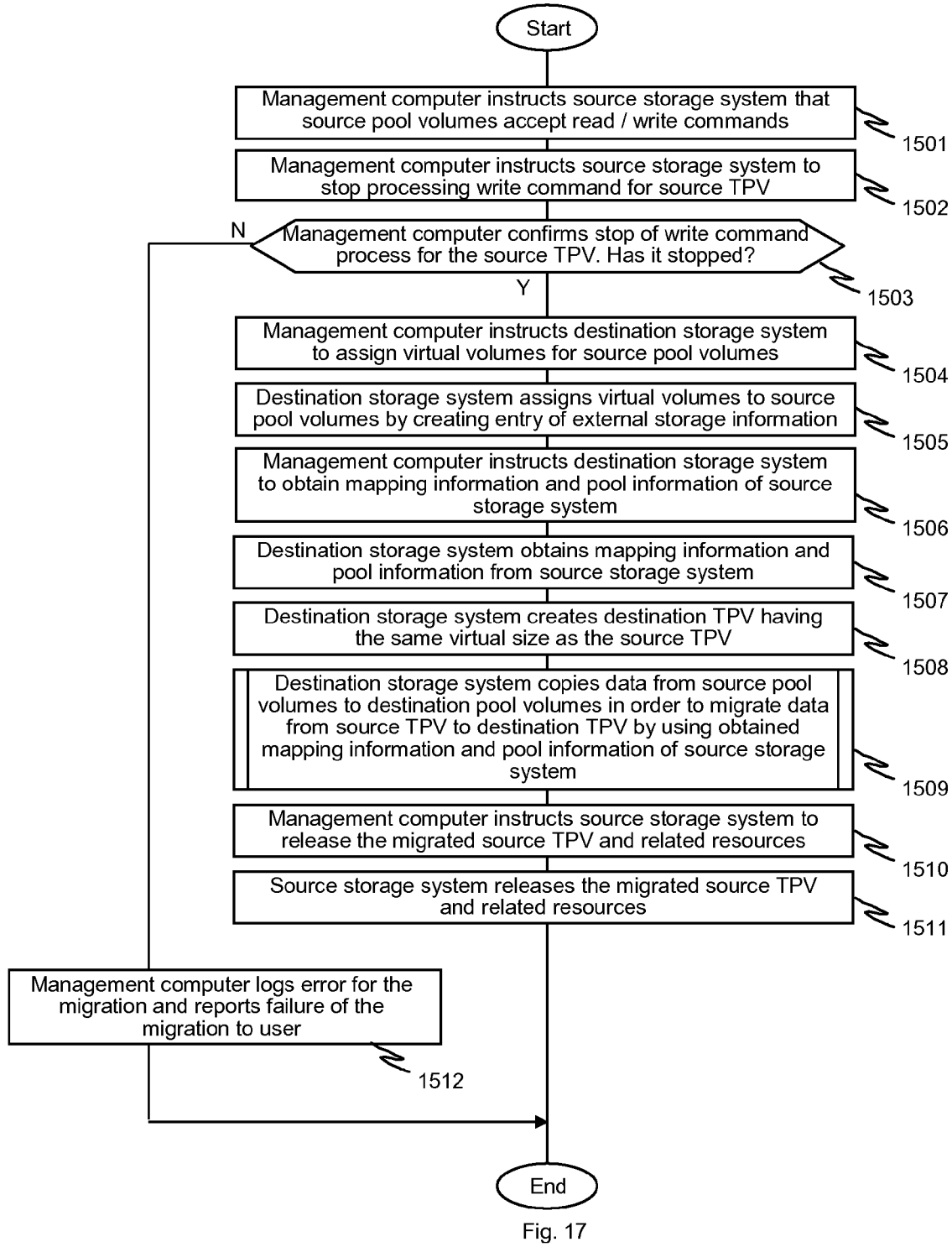
FIG. 17 illustrates an exemplary process for efficient migration of data from source TPV in source storage system to destination TPV in destination storage system.

FIG. 17 describes process for efficient migration of data from source TPV 610 in source storage system 100 to destination TPV 610 in destination storage system 100.

Before the beginning of this process, source pool volumes 620 related to the source TPV 610 in the source storage system 100 have to be reachable from the destination storage system 100 via SAN 900.

Step 1501-1505 and step 1512 are the same as step 1201-1205 and step 1212 described in FIG. 10. The differences are explained below.

At step 1506, the management computer 520 instructs the destination storage system 100 to obtain mapping information 201 of the source storage system 100 for the source TPV 610 and pool information 202 of the source storage system 100 for the source pool volume 620.

At step 1507, the destination storage system 100 communicates with the source storage system 100 via LAN 902 and obtains the mapping information 201 and the pool information 202 from the source storage system 100.

At step 1508, the destination storage system 100 creates destination TPV 610 having the same virtual size as the source TPV 610. The destination TPV 610 has initial state of TPV 610 at this time.

At step 1509, the destination storage system 100 copies data from source pool volumes 620 to destination pool volumes 620 for migration between the source TPV 610 to the destination TPV 610 according to obtained mapping information 201 and pool information 202. The detailed process of copy process is described later. The destination storage system 100 can process write command and read command from host 500 in parallel with the copy process.

After completion of the copying, at step 1510, the management computer 520 instructs the source storage system 100 to release the source TPV 610 and related resources such as storage area in the source pool volumes 620 and memory to maintain information for the source TPV 610. The management computer 520 monitors progress and completion of the copying.

At step 1511, the source storage system 100 deletes the source TPV 610 and releases the related resources. These released resources can be reused by the source storage system 100. They may also be reused by the destination storage system 100 via SAN 900. For example, the destination storage system 100 can use the released pool volumes 620 as external storage and can apply them as additional pool volumes 620.

Examples of mapping information 201 and pool information 202 used in this embodiment are shown in FIG. 18 and FIG. 19. Each element of the tables is the same as the element explained in the previous embodiment.

B.2. Copy Process for Migration of TPV

Figure 20:
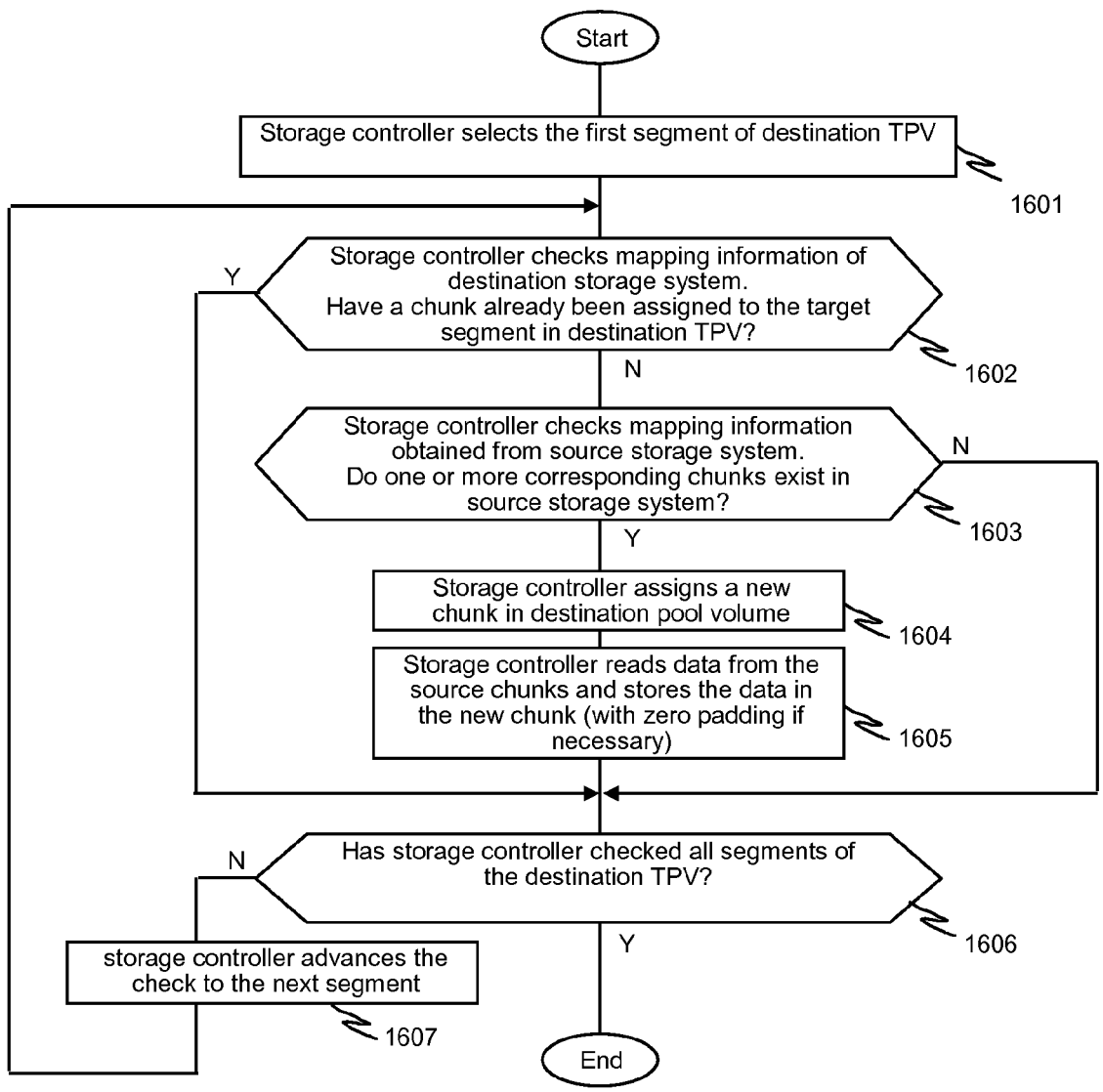
FIG. 20 illustrates an exemplary embodiment of a copy process for migration of data stored in the source TPV to the destination TPV.

FIG. 20 illustrates the aforesaid copy process for migration of data stored in the source TPV 610 to the destination TPV 610.

At step 1601, storage controller 110 of the destination storage system 100 selects the first segment of destination TPV 610 as the segment to be processed.

At step 1602, the storage controller 110 checks mapping information 201 of the destination storage system 100 for the segment. If a chunk in the destination storage system 100 has already been assigned to the segment, the process proceeds to step 1606. If not, the process proceeds to step 1603.

At step 1603, the storage controller 110 checks mapping information 201 obtained from the source storage system 100. If one or more chunks corresponding to the segment exist in source pool volumes 620 of the source storage system 100, the process proceeds to step 1604. If not, the process proceeds to step 1606. The storage controller 110 can recognize how the destination segment corresponds to source segments by calculation with destination segment ID, destination segment size, source segment ID and source segment size as illustrated in FIG. 16 (e.g. first source segment ID=(destination segment ID×destination segment size)/source segment size).

At step 1604, the storage controller 110 assigns a new chunk in destination pool volumes 620 in the destination storage system 100. To do this, the storage controller 110 updates mapping information 201 and pool information 202 of the destination storage system 100.

Figure 21:
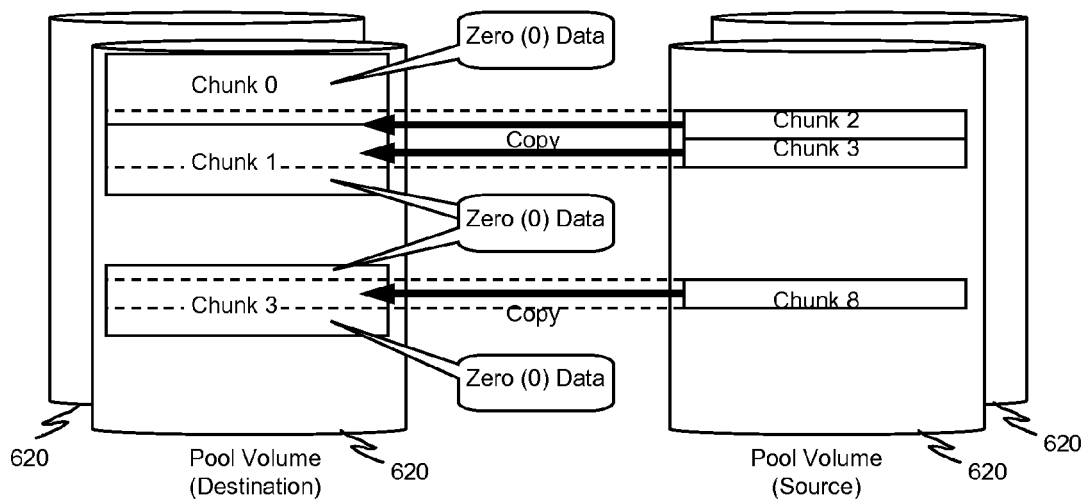
FIG. 21 illustrates an exemplary correspondence of the data to the new chunk.

At step 1605, the storage controller 110 reads data from the corresponding chunks in the source pool volumes 620 via SAN 900 and stores the data to the new chunk according to the correspondence (i.e. overlapping of the destination segment and source segment having chunk) as shown in FIG. 21. If the destination segment partially includes area that no source chunk corresponds to, the storage controller 100 stores data of zero (0) to the area of new chunk as described in FIG. 21.

At step 1606, if the storage controller 110 has checked all segments of the destination TPV 610, the process ends. If not, the storage controller 110 advances the check to the next segment (step 1607).

B.3. Write Process for TPV

Figure 22:
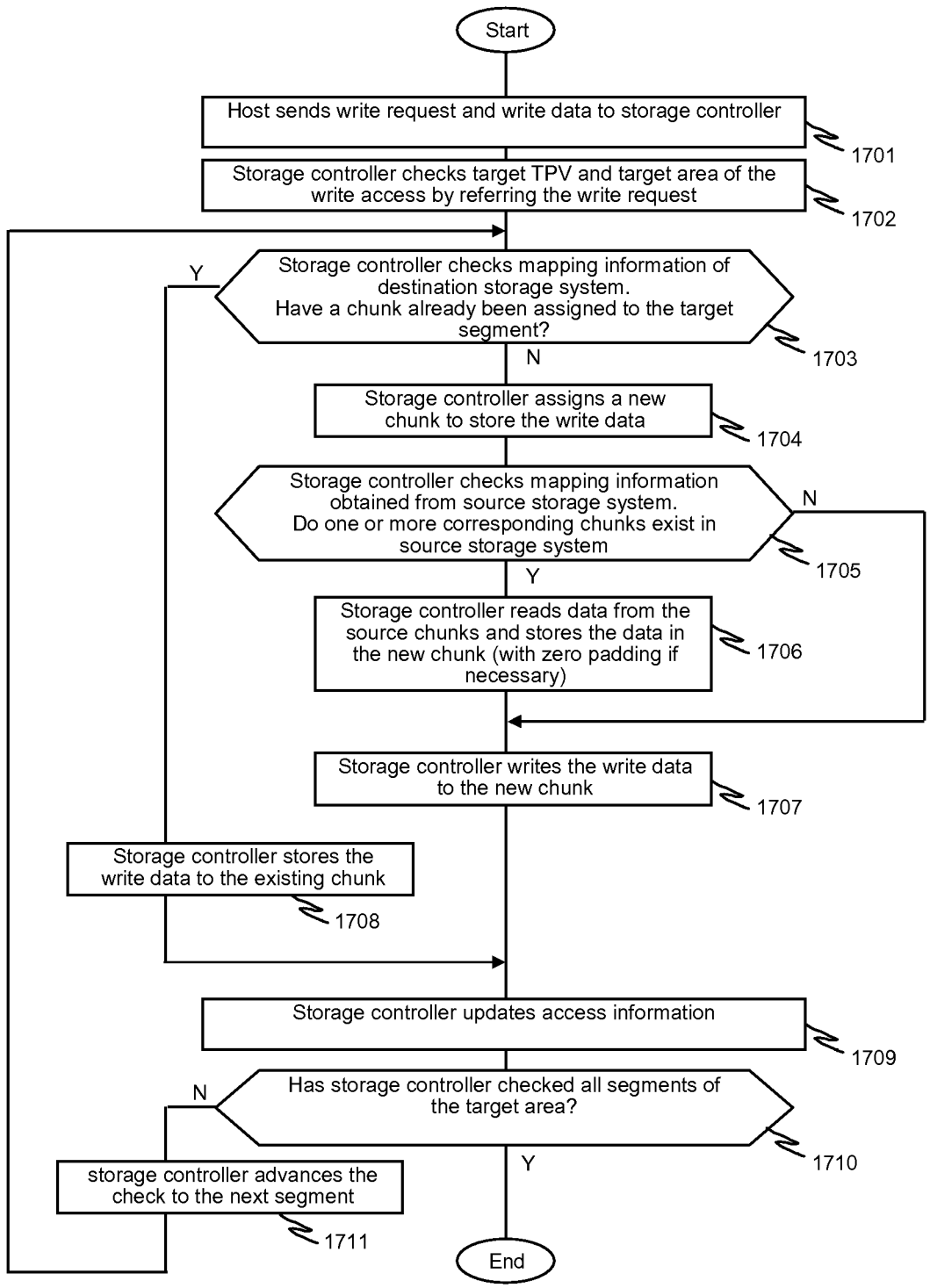
FIG. 22 illustrates an exemplary write process for destination TPV.

FIG. 22 illustrates a write process for destination TPV 610. This process can be performed in parallel with the above copy process. In other words, the destination storage system 100 can accept write command in parallel with performing the copy process.

At step 1701, host 500 issues a write request and transfers write data to storage controller 110 of the destination storage system 100.

At step 1702, the storage controller 110 checks target TPV 610 and target area of the write access by referring the write request.

At step 1703, the storage controller 110 checks the mapping information 201 of the destination storage system 100 for a segment in the target area. If a chunk has already been assigned to the segment, the process proceeds to step 1708. If not, the process proceeds to step 1704.

At step 1704, the storage controller 110 assigns a new chunk to store the write data. To do this, the storage controller 110 updates mapping information 201 and pool information 202.

At step 1705, the storage controller 110 checks mapping information 201 obtained from the source storage system 100. If one or more chunks corresponding to the target area exist in source pool volumes 620 of the source storage system 100, the process proceeds to step 1706. If not, the process proceeds to step 1707.

At step 1706, the storage controller 110 reads data from the corresponding chunks in the source pool volumes 620 via SAN 900 and stores the data to the new chunk according to the correspondence (i.e. overlapping of the destination segment and source segment having chunk). If the destination segment partially includes area that no source chunk corresponds to, the storage controller 100 stores data of zero (0) to the area of new chunk.

At step 1707, the storage controller 110 stores the write data to the new chunk.

At step 1708, the storage controller 110 stores the write data to the existing chunk in destination pool volume 620 of the destination storage system 100.

At step 1709, the storage controller 110 updates access information 204.

At step 1710, if the storage controller 110 has checked all segments of the target area, the process ends. If not, the storage controller 110 advances the check to the next segment (step 1711).

B.4. Read Process for TPV

Figure 23:
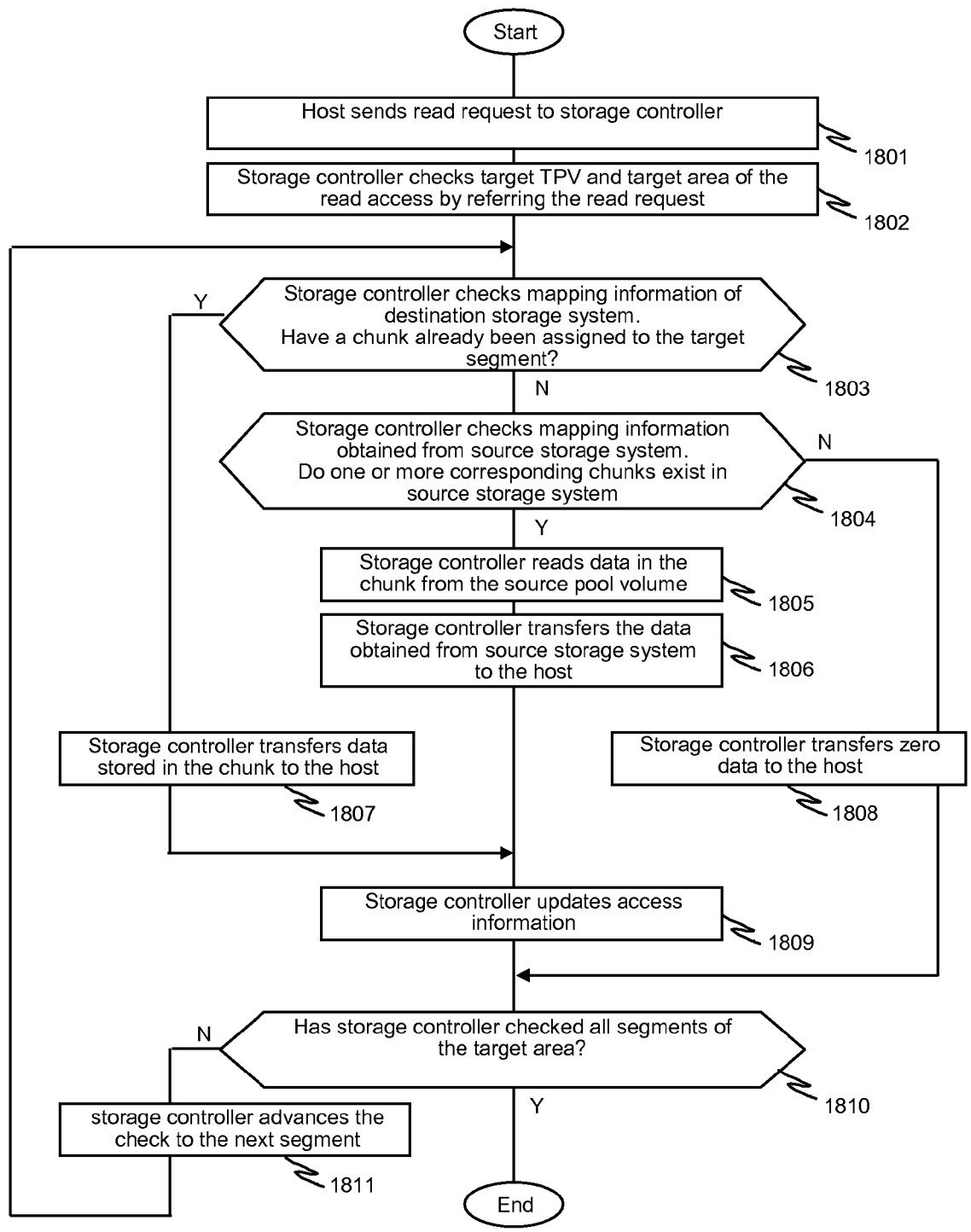
FIG. 23 illustrates an exemplary read process for a destination TPV.

FIG. 23 shows a read process for destination TPV 610. This process can also be performed in parallel with the above copy process. In other words, the destination storage system 100 can accept read command in parallel with performing the copy process.

At step 1801, host 500 issues a read request to storage controller 110 of the destination storage system 100.

At step 1802, the storage controller 110 checks target TPV 610 and target area of the read access by referring the read request.

At step 1803, the storage controller 110 checks the mapping information 201 of the destination storage system 100 for a segment in the target area. If a chunk has already been assigned to the segment, the process proceeds to step 1807. If not, the process proceeds to step 1804.

At step 1804, the storage controller 110 checks mapping information 201 obtained from the source storage system 100. If one or more chunks corresponding to the target area exist in source pool volumes 620 of the source storage system 100, the process proceeds to step 1805. If not, the process proceeds to step 1808.

At step 1805, the storage controller 110 reads data from the corresponding chunks in the source pool volumes 620 via SAN 900.

At step 1806, the storage controller 110 transfer the read data to the host 500. If the target area includes area that no source chunk corresponds to, the storage controller 100 fills the gap with data of zero (0) in transferring the data.

At step 1807, the storage controller 110 transfers data stored in the existing chunk in destination pool volume 620 of the destination storage system to the host 500.

At step 1808, the storage controller 110 sends data of zero (0) to the host 500.

At step 1809, the storage controller 110 updates access information 204.

At step 1810, if the storage controller 110 has checked all segments of the target area, the process ends. If not, the storage controller 110 advances the check to the next segment (step 1811).

By using the method described above, efficient migration of TPV between pluralities of storage systems is achieved even if the segment size is different between the storage systems. This migration method realizes reduction of amount of data handled and transferred in the migration.

Figure 27:
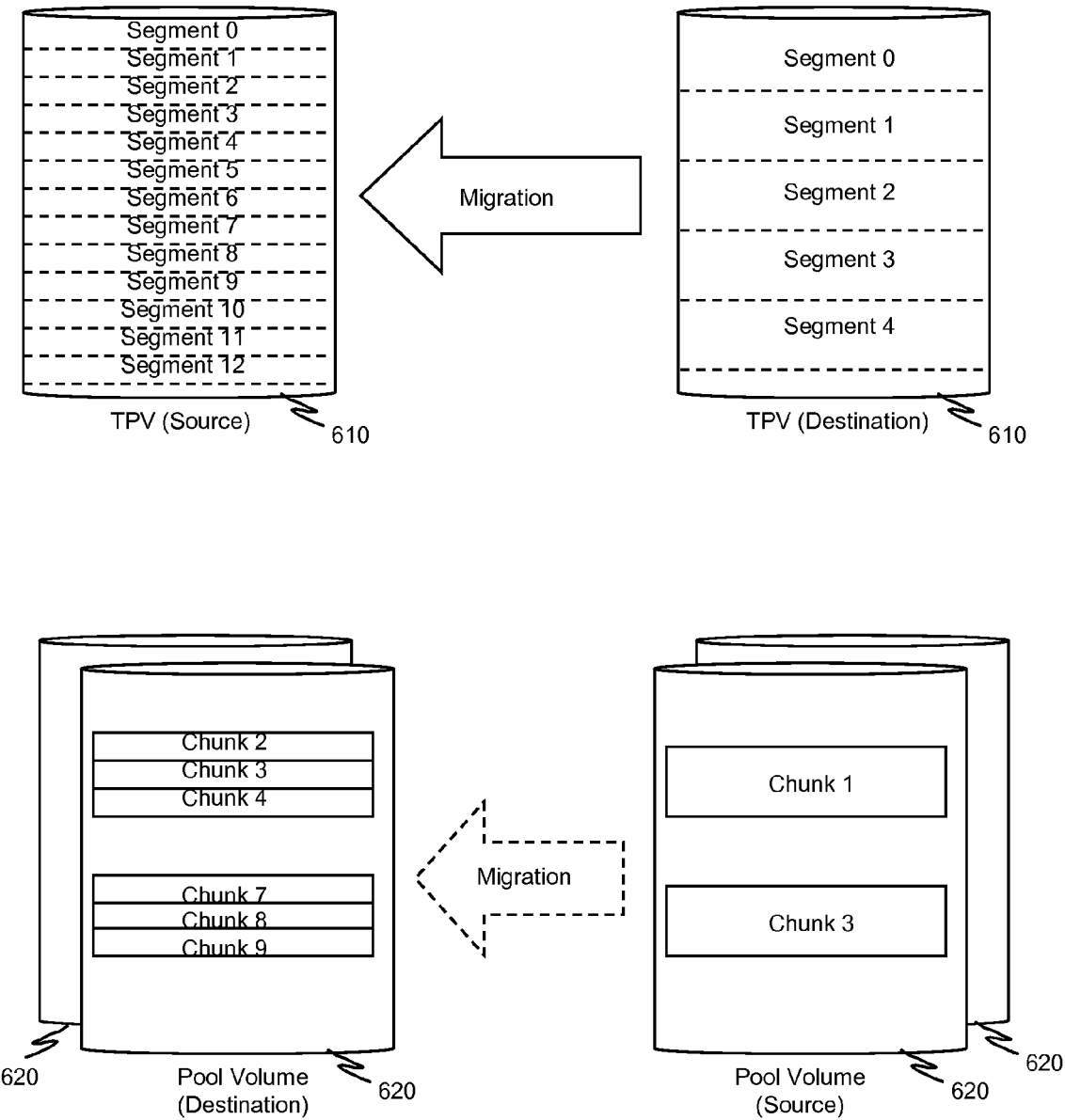
FIG. 27 illustrates another example of unmatched boundary of segment and chunk between source storage system and destination storage system.
Figure 28:
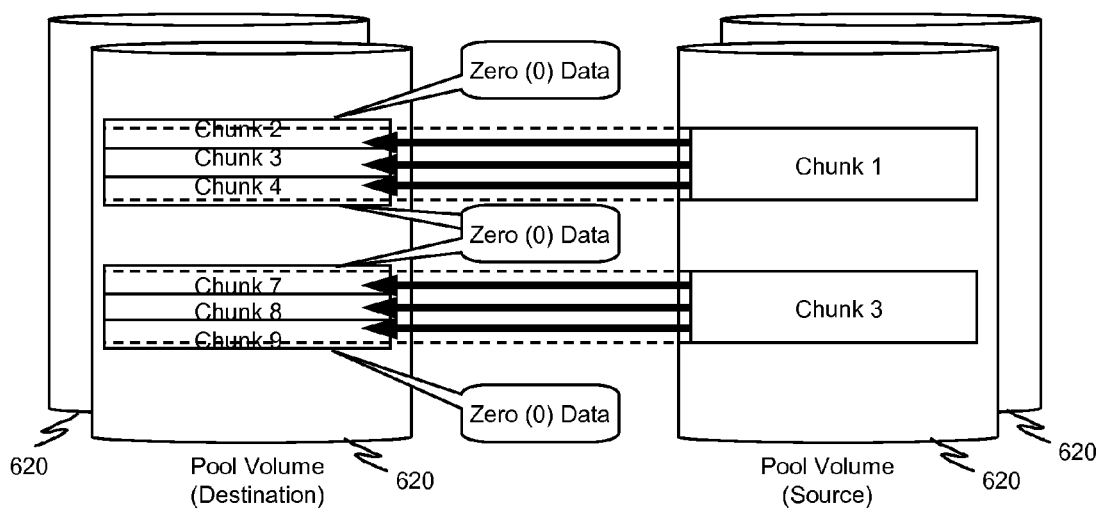
FIG. 28 illustrates another exemplary correspondence of the data to the new chunk.

In addition to migration from small segments to large segments illustrated in FIG. 16 and FIG. 21, the method described in this embodiment can be applied to migration from large segments to small segments as illustrated in FIG. 27 and FIG. 28.

C. 3rd Embodiment

The following processes described in this embodiment realize migration of TPV 610 by copying data from source TPV 610 not pool volumes 620. By using the method described below, efficient migration of TPV 610 between pluralities of storage systems is achieved even if the segment size is different between the storage systems. This migration method can realize benefits such as reduction of amount of data transferred in the migration.

C.1. Process for Migration of TPV Between Storage Systems

Figure 24:
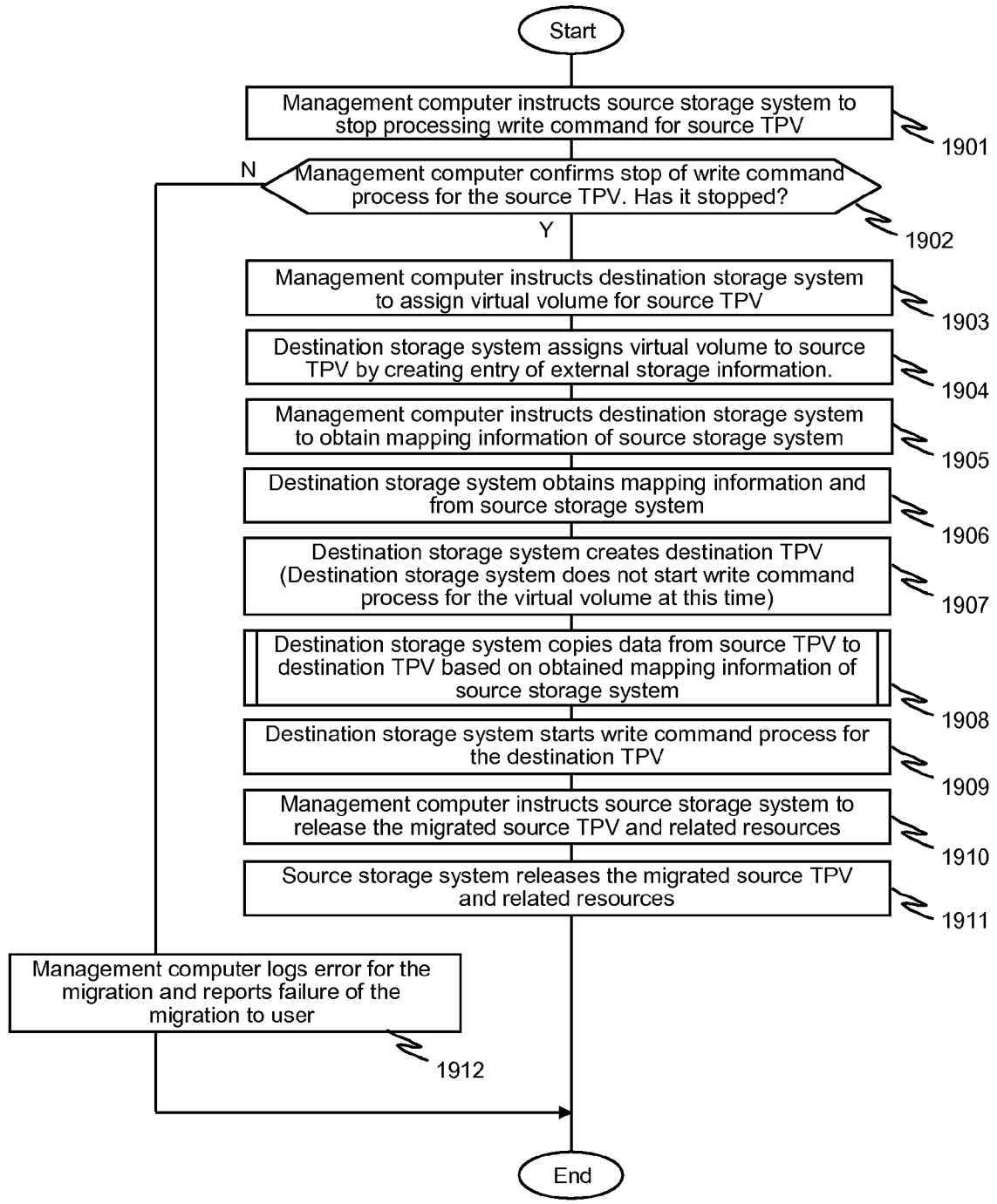
FIG. 24 illustrates an exemplary process for efficient migration of data from source TPV in source storage system to destination TPV in destination storage system.

FIG. 24 describes process for efficient migration of data from source TPV 610 in source storage system 100 to destination TPV 610 in destination storage system 100.

Before the beginning of this process, the source TPV 610 in the source storage system 100 have to be reachable from the destination storage system 100 via SAN 900.

Step 1910-1912 are the same as step 1510-1512 described in FIG. 17. The differences are explained in detail below.

At step 1901, the management computer 520 instructs source storage system 100 to prohibit write access to source TPV 610.

At step 1902, the management computer 520 checks whether the write process is stopped or not. If the write process is stopped successfully, the process proceeds to step 1903. If not, the process proceeds to step 1912.

At step 1903, the management computer 520 instructs destination storage system 100 to assign virtual volumes for source TPV 610 with write protection.

At step 1904, the destination storage system 100 assigns virtual volume to the source TPV 610 as external storage by updating external storage information 203. As described in U.S. Pat. No. 7,162,600, the destination storage system 100 can access volumes in source storage system 100 as own volume by using this information. The virtual volume is write-protected.

At step 1905, the management computer 520 instructs the destination storage system 100 to obtain mapping information 201 of the source storage system 100 for the source TPV 610.

At step 1906, the destination storage system 100 communicates with the source storage system 100 via LAN 902 and obtains the mapping information 201 from the source storage system 100.

At step 1907, the destination storage system 100 creates destination TPV 610 having the same virtual size as the source TPV 610. The destination TPV 610 has initial state of TPV 610 at this time. The destination storage system 100 rejects write commands from host 500 to the destination TPV 610 at this time.

At step 1908, the destination storage system 100 copies data from the source TPV 610 to the destination TPV 610 according to obtained mapping information 201. The detailed process of copy process is described later.

After completion of the copying, at step 1909, the destination storage system 100 starts to accept write commands from host 500 to the destination TPV 610.

C.2. Copy Process for Migration of TPV

Figure 25:
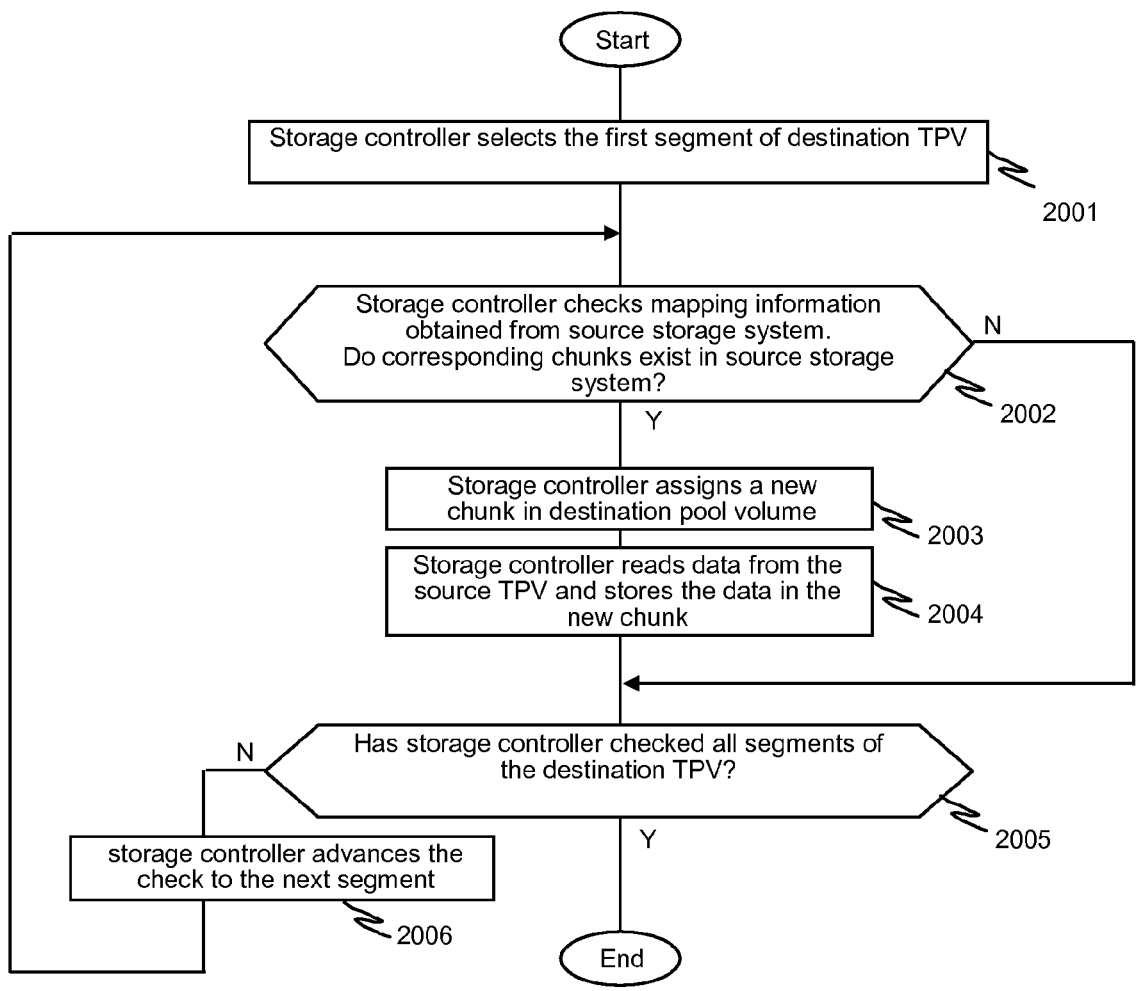
FIG. 25 illustrates a copy process for migration of data stored in the source TPV to the destination TPV.

FIG. 25 illustrates the aforesaid copy process in this embodiment for migration of data stored in the source TPV 610 to the destination TPV 610.

At step 2001, storage controller 110 of the destination storage system 100 selects the first segment of destination TPV 610 as the segment to be processed.

At step 2002, the storage controller 110 checks mapping information 201 obtained from the source storage system 100. If one or more chunks corresponding to the segment exist in source pool volumes 620 of the source storage system 100, the process proceeds to step 2003. If not, the process proceeds to step 2005.

At step 2003, the storage controller 110 assigns a new chunk in destination pool volumes 620 in the destination storage system 100. To do this, the storage controller 110 updates mapping information 201 and pool information 202 of the destination storage system 100.

At step 2004, the storage controller 110 reads data from the source TPV 610 via SAN 900 according to the aforesaid correspondence (i.e. overlapping of the destination segment and source segment having chunk). And then, the storage controller 110 stores the data to the new chunk according to the correspondence. When the destination segment partially includes area that no source chunk corresponds to, the storage controller 100 stores data of zero (0) to the area of new chunk.

At step 2005, if the storage controller 110 has checked all segments of the destination TPV 610, the process ends. If not, the storage controller 110 advances the check to the next segment (step 2006).

Figure 26:
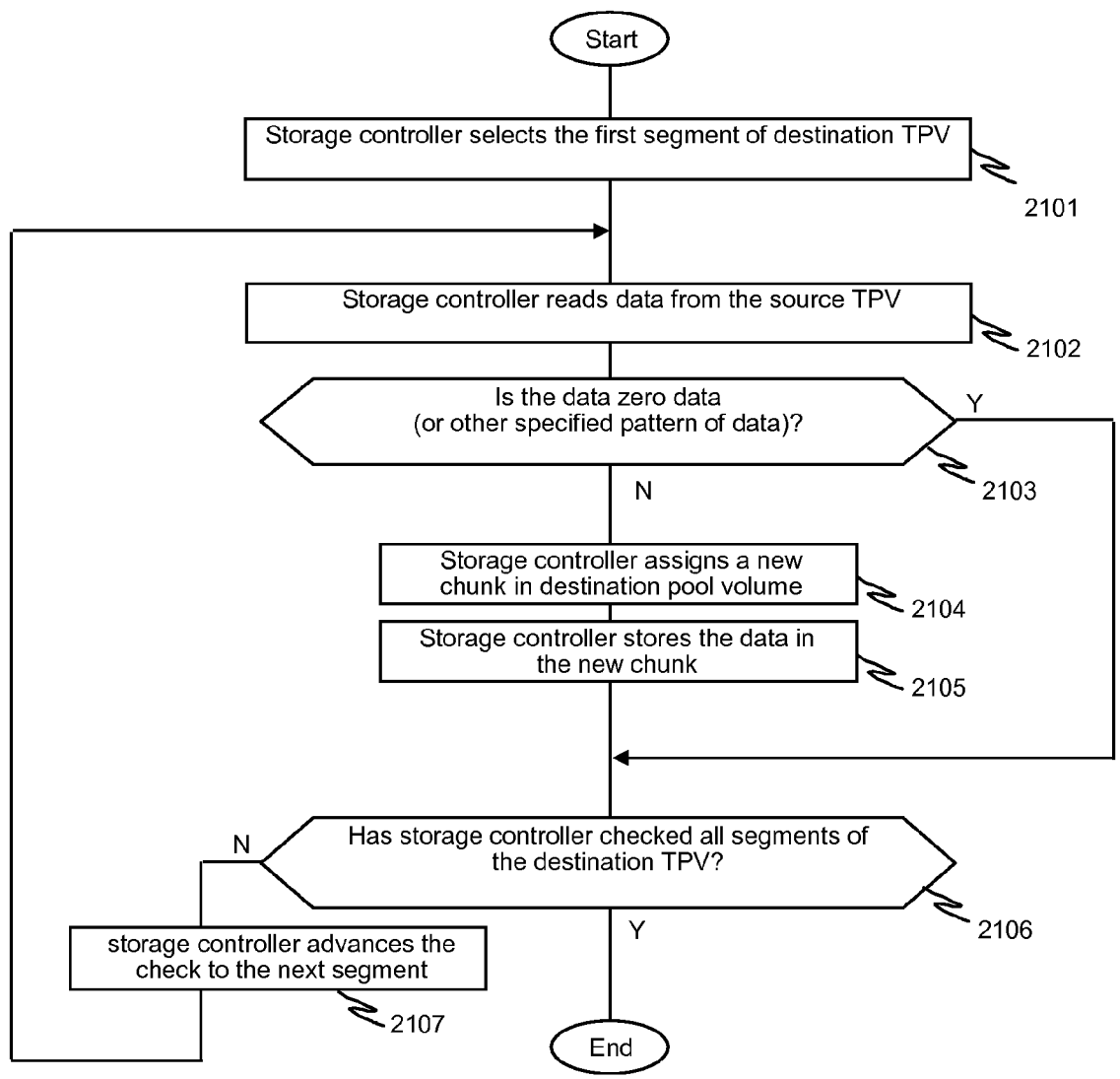
FIG. 26 illustrates another copy process for migration of data stored in the source TPV to the destination TPV.

FIG. 26 illustrates another embodiment of the copy process for migration of data stored in the source TPV 610 to the destination TPV 610. This copy process performs detection of zero (0) data to eliminate unnecessary storing of data. Therefore, with this copy process, acquisition of mapping information 201 from the source storage system 100 is not required to eliminate unnecessary storing of data.

At step 2101, storage controller 110 of the destination storage system 100 selects the first segment of destination TPV 610 as the segment to be processed.

At step 2102, the storage controller 110 reads data of area corresponding to the destination segment from the source TPV 610 via SAN 900.

At step 2103, the storage controller 110 checks the data. If the data is all zero (0) data, the process proceeds to step 2106. If not, the process proceeds to step 2104.

At step 2104, the storage controller 110 assigns a new chunk in destination pool volumes 620 in the destination storage system 100. To do this, the storage controller 110 updates mapping information 201 and pool information 202 of the destination storage system 100.

At step 2105, the storage controller 110 stores the data to the new chunk.

At step 2106, if the storage controller 110 has checked all segments of all segments of the destination TPV 610, the process ends. If not, the storage controller 110 advances the check to the next segment (step 2107).

In the above process, zero data is recognized as data indicating unused data. Other specific (predetermined) pattern of data can be utilized as data indicating unused data. That is, at step 2103, the specified pattern of data can be detected instead of zero data. Moreover, multiple patterns of data which may include all zero can be utilized as data indicating unused data.

In the above methods for migration, the migration processes are performed according to instructions from management computer 520. However, the process may be performed according to a migration management function of the storage systems 100 without management computer 520. For example, the principal capability of the management computer 520 mentioned above may be possessed in the destination storage system 100 or the source storage system 100 by executing the management program 520 in the storage system 100.

D. Exemplary Computer Platform

Figure 29:
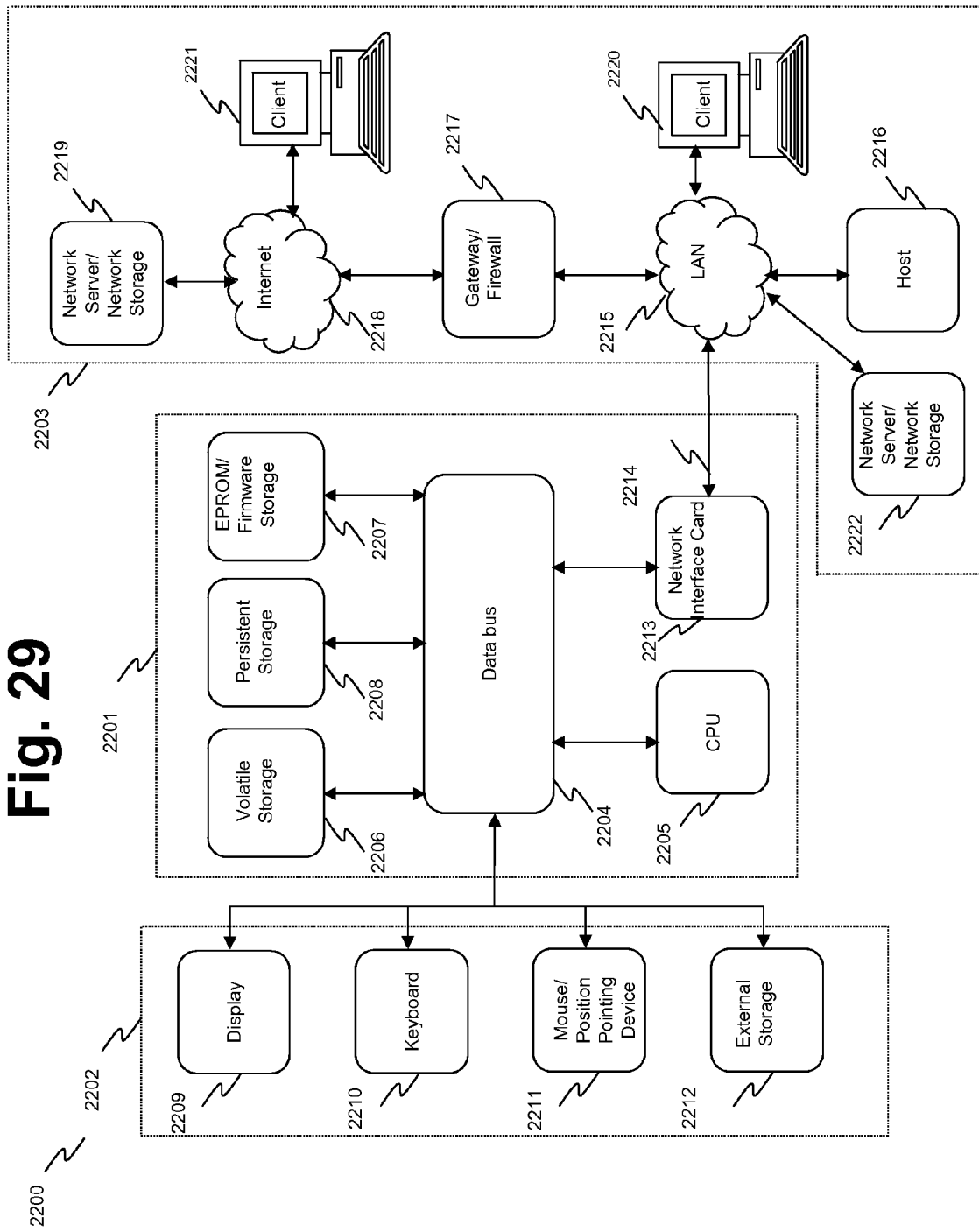
FIG. 29 illustrates an exemplary embodiment of a computer platform upon which the inventive system may be implemented.

FIG. 29 is a block diagram that illustrates an embodiment of a computer/server system 2200 upon which an embodiment of the inventive methodology may be implemented. The system 2200 includes a computer/server platform 2201, peripheral devices 2202 and network resources 2203.

The computer platform 2201 may include a data bus 2204 or other communication mechanism for communicating information across and among various parts of the computer platform 2201, and a processor 2205 coupled with bus 2201 for processing information and performing other computational and control tasks. Computer platform 2201 also includes a volatile storage 2206, such as a random access memory (RAM) or other dynamic storage device, coupled to bus 2204 for storing various information as well as instructions to be executed by processor 2205. The volatile storage 2206 also may be used for storing temporary variables or other intermediate information during execution of instructions by processor 2205. Computer platform 2201 may further include a read only memory (ROM or EPROM) 2207 or other static storage device coupled to bus 2204 for storing static information and instructions for processor 2205, such as basic input-output system (BIOS), as well as various system configuration parameters. A persistent storage device 2208, such as a magnetic disk, optical disk, or solid-state flash memory device is provided and coupled to bus 2201 for storing information and instructions.

Computer platform 2201 may be coupled via bus 2204 to a display 2209, such as a cathode ray tube (CRT), plasma display, or a liquid crystal display (LCD), for displaying information to a system administrator or user of the computer platform 2201. An input device 2210, including alphanumeric and other keys, is coupled to bus 2201 for communicating information and command selections to processor 2205. Another type of user input device is cursor control device 2211, such as a mouse, a trackball, or cursor direction keys for communicating direction information and command selections to processor 2204 and for controlling cursor movement on display 2209. This input device typically has two degrees of freedom in two axes, a first axis (e.g., x) and a second axis (e.g., y), that allows the device to specify positions in a plane.

An external storage device 2212 may be coupled to the computer platform 2201 via bus 2204 to provide an extra or removable storage capacity for the computer platform 2201. In an embodiment of the computer system 2200, the external removable storage device 2212 may be used to facilitate exchange of data with other computer systems.

The invention is related to the use of computer system 2200 for implementing the techniques described herein. In an embodiment, the inventive system may reside on a machine such as computer platform 2201. According to one embodiment of the invention, the techniques described herein are performed by computer system 2200 in response to processor 2205 executing one or more sequences of one or more instructions contained in the volatile memory 2206. Such instructions may be read into volatile memory 2206 from another computer-readable medium, such as persistent storage device 2208. Execution of the sequences of instructions contained in the volatile memory 2206 causes processor 2205 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 2205 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 2208. Volatile media includes dynamic memory, such as volatile storage 2206.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 2205 for execution. For example, the instructions may initially be carried on a magnetic disk from a remote computer. Alternatively, a remote computer can load the instructions into its dynamic memory and send the instructions over a telephone line using a modem. A modem local to computer system 2200 can receive the data on the telephone line and use an infra-red transmitter to convert the data to an infra-red signal. An infra-red detector can receive the data carried in the infra-red signal and appropriate circuitry can place the data on the data bus 2204. The bus 2204 carries the data to the volatile storage 2206, from which processor 2205 retrieves and executes the instructions. The instructions received by the volatile memory 2206 may optionally be stored on persistent storage device 2208 either before or after execution by processor 2205. The instructions may also be downloaded into the computer platform 2201 via Internet using a variety of network data communication protocols well known in the art.

The computer platform 2201 also includes a communication interface, such as network interface card 2213 coupled to the data bus 2204. Communication interface 2213 provides a two-way data communication coupling to a network link 2214 that is coupled to a local network 2215. For example, communication interface 2213 may be an integrated services digital network (ISDN) card or a modem to provide a data communication connection to a corresponding type of telephone line. As another example, communication interface 2213 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 2213 sends and receives electrical, electromagnetic or optical signals that carry digital data streams representing various types of information.

Network link 2213 typically provides data communication through one or more networks to other network resources. For example, network link 2214 may provide a connection through local network 2215 to a host computer 2216, or a network storage/server 2217. Additionally or alternatively, the network link 2213 may connect through gateway/firewall 2217 to the wide-area or global network 2218, such as an Internet. Thus, the computer platform 2201 can access network resources located anywhere on the Internet 2218, such as a remote network storage/server 2219. On the other hand, the computer platform 2201 may also be accessed by clients located anywhere on the local area network 2215 and/or the Internet 2218. The network clients 2220 and 2221 may themselves be implemented based on the computer platform similar to the platform 2201.

Local network 2215 and the Internet 2218 both use electrical, electromagnetic or optical signals that carry digital data streams. The signals through the various networks and the signals on network link 2214 and through communication interface 2213, which carry the digital data to and from computer platform 2201, are exemplary forms of carrier waves transporting the information.

Computer platform 2201 can send messages and receive data, including program code, through the variety of network(s) including Internet 2218 and LAN 2215, network link 2214 and communication interface 2213. In the Internet example, when the system 2201 acts as a network server, it might transmit a requested code or data for an application program running on client(s) 2220 and/or 2221 through Internet 2218, gateway/firewall 2217, local area network 2215 and communication interface 2213. Similarly, it may receive code from other network resources.

The received code may be executed by processor 2205 as it is received, and/or stored in persistent or volatile storage devices 2208 and 2206, respectively, or other non-volatile storage for later execution. In this manner, computer system 2201 may obtain application code in the form of a carrier wave.

It should be noted that the present invention is not limited to any specific firewall system. The inventive policy-based content processing system may be used in any of the three firewall operating modes and specifically NAT, routed and transparent.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized systems for migrating thin provisioning volumes and for unifying the storage resource pool. It is intended that the specification and examples be considered as exemplary only, with a true scope and spirit of the invention being indicated by the following claims.

What is claimed is:

1. A storage system configured as a destination storage system for a migration, the storage system coupled to another storage system, the storage system comprising:
   a plurality of storage disks;
   a storage controller configured to:
   manage a pool volume having a storage area provided by the plurality of the storage disks,
   manage a virtual volume as a thin provisioned volume having one or more segments of a first size to which one or more chunks in the pool volume are allocated when the storage controller writes to the one or more segments,
   wherein, when data, stored in a source virtual volume managed by the another storage system as another thin provisioned volume having one or more segments of a second size different from the first size, is migrated to the virtual volume, the storage controller is further configured to:
   obtain mapping information of the source virtual volume from the another storage system configured as a source storage system for the migration;
   check the obtained mapping information to determine whether another chunk in another pool volume managed by the another storage system has been allocated to a source segment of the source virtual volume,
   recognize a destination segment, corresponding to the source segment, in the virtual volume based on a size of the destination segment and a size of the source segment, and
   read the data stored in the source segment to store the data in the recognized destination segment of the virtual volume, if the another chunk has been allocated to the another segment.

2. The storage system according to claim 1, wherein the storage controller is further configured to:
   allocate a new chunk to the destination segment, and
   store the data to the allocated chunk.

3. The storage system according to claim 2, wherein the storage controller is further configured to:
   update mapping information of the virtual volume, if the storage controller allocates the new chunk to the destination segment of the virtual volume.

4. The storage system according to claim 1, wherein the storage controller is further configured to:
   not read the data stored in the source segment for migration if the another chunk has not been allocated to the source segment.

5. The storage system according to claim 1, wherein the mapping information of the source virtual volume indicates whether the another chunk has been allocated to the another segment.

6. A storage system comprising:
   a first storage apparatus configured as a destination storage apparatus for a migration, comprising:
   a plurality of first storage disks, and
   a first storage controller configured to:
   manage a first pool volume having a storage area provided by the plurality of the first storage disks, and
   manage a first virtual volume as a thin provisioned volume having one or more first segments of a first size to which one or more first chunks in the first pool volume is allocated when the first storage controller writes to the one or more first segments and,
   a second storage apparatus coupled to the first storage apparatus and configured as a source storage apparatus for the migration, comprising:
   a plurality of second storage disks, and
   a second storage controller configured to:
   manage a second pool volume having a storage area provided by the plurality of the second storage disks, and
   manage a second virtual volume as another thin provisioned volume having one or more second segments of a second size different from the first size to which a one or more second chunks in the second pool volume is allocated when the second storage controller writes to the one or more second segments;
   wherein when data stored in the second virtual volume managed by the second storage system is to be migrated to the first virtual volume, the first storage controller is configured to:
   obtain mapping information of the second virtual volume from the second storage system and check the obtained mapping information to determine whether a source one of the one or more second chunks has been allocated to a source one of the one or more second segments of the second virtual volume;
   recognize a destination one of the one or more first segments, corresponding to the source one of the one or more second segments, in the first virtual volume based on a size of the destination one of the one or more first segments and a size of the source one of the one or more second segments; and
   read the data stored in the source one of the one or more second segments to store the data in the recognized destination one of the one or more first segments of the first virtual volume.

7. The storage system according to claim 6, wherein the first storage controller is further configured to:
   allocate a new chunk to the destination one of the one or more first segments of the first virtual volume, and
   store the data to the allocated chunk.

8. The storage system according to claim 7, wherein the first storage controller is further configured to:
   update mapping information of the first virtual volume, if the first storage controller allocates the new chunk to the destination one of the one or more segments of the first virtual volume.

9. The storage system according to claim 6, wherein the first storage controller is further configured to:
   not read the data stored in the one or more second segments for migration if the source one of the one or more second chunks has not been allocated to the source one of the one or more second segments.

10. The storage system according to claim 6, wherein the mapping information of the second virtual volume indicates whether the source one of the one or more second chunks has been allocated to the source one of the one or more second segments.

11. A method, comprising:
   managing a first pool volume having a storage area that is provided by a plurality of storage disks of a first storage system configured as a destination storage system for a migration,
   managing a first virtual volume configured as a thin provisioned volume having one or more first segments of a first size to which one or more first chunks in the first pool volume is allocated when a write is performed to the one or more first segments,
   wherein when data stored in a second virtual volume configured as another thin provisioned volume having one or more second segments of a second size different from the first size and managed by a second storage system is migrated to the first virtual volume:
   obtaining mapping information of the second virtual volume from the second storage system;
   checking the obtained mapping information to determine whether a second chunk in a second pool volume managed by the second storage system has been allocated to a second segment of the second virtual volume,
   recognizing a destination one of the one or more first segments, corresponding to the second segment, in the first virtual volume based on a size of the destination one of the one or more first segments and a size of the second segment; and
   reading the data stored in the one or more second segments to store the data in the destination one of the one or more first segments of the first virtual volume.

12. The method of claim 11, further comprising:
   allocating a new chunk to the destination one of the one or more first segments of the first virtual volume, and
   storing the data to the allocated chunk.

13. The method of claim 12, further comprising:
   updating mapping information of the first virtual volume, if the new chunk is allocated to the destination one of the one or more segments of the first virtual volume.

14. The method of claim 11, further comprising:
   not reading the data stored in the second segment for migration if the second chunk has not been allocated to the second segment.

15. The method of claim 11, wherein the mapping information of the second virtual volume indicates whether the second chunk has been allocated to the second segment.

* * * * *